US008571211B2

(12) United States Patent  
Suh et al.

(10) Patent No.: US 8,571,211 B2  
(45) Date of Patent: Oct. 29, 2013

(54) METHOD AND APPARATUS FOR GENERATING SECURITY KEY IN A MOBILE COMMUNICATION SYSTEM

(75) Inventors: Kyung-Joo Suh, Seoul (KR); Ji-Cheol Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1318 days.

(21) Appl. No.: 12/152,354

(22) Filed: May 14, 2008

(65) Prior Publication Data

US 2008/0285749 A1 Nov. 20, 2008

(30) Foreign Application Priority Data

May 14, 2007 (KR) .................... 2007-46308  
Jun. 8, 2007 (KR) .................... 2007-56248

(51) Int. Cl.  
*H04L 29/06* (2006.01)

(52) U.S. Cl.  
USPC .......................... 380/45; 380/277

(58) Field of Classification Search  
USPC .......................... 380/45, 44, 277  
See application file for complete search history.

(56) References Cited

U.S. PATENT DOCUMENTS

| | | | | |
|---|---|---|---|---|
| 8,230,212 | B2* | 7/2012 | Feder et al. | 713/155 |
| 2007/0112967 | A1* | 5/2007 | Lee et al. | 709/229 |
| 2007/0250706 | A1* | 10/2007 | Oba | 713/159 |
| 2008/0063204 | A1* | 3/2008 | Braskich et al. | 380/270 |
| 2009/0132811 | A1* | 5/2009 | Koster et al. | 713/156 |
| 2009/0217033 | A1* | 8/2009 | Costa et al. | 713/155 |
| 2012/0198243 | A1* | 8/2012 | Matsushima et al. | 713/193 |

FOREIGN PATENT DOCUMENTS

| | | |
|---|---|---|
| KR | 1020070051233 | 5/2007 |
| WO | WO 2007/000179 | 1/2007 |

OTHER PUBLICATIONS

Extensible Authentication Protocol (EAP) Key Management Framework; http://tools.ietf.org/html/draft-ietf-eap-keying-04 (73pgs).

* cited by examiner

*Primary Examiner* — Lisa Lewis  
(74) *Attorney, Agent, or Firm* — The Farrell Law Firm, P.C.

(57) ABSTRACT

Disclosed is an apparatus and method for generating a security key in a mobile communication system that performs security key generation. An Authentication, Authorization and Accounting (AAA) server generates a Master Session Key (MSK) and an Enhanced MSK (EMSK) from a Long Term Credential key, and a Device-MSK (D-MSK), a User-MSK (U-MSK) and a Device and User-MSK (DU-MSK) from the MSK and the EMSK. An Access Gateway (AG) generates a Root-MSK (R-MSK) from the MSK and EMSK received from the AAA server. A Signaling Radio Network Controller (SRNC) generates a Pairwise Master Key (PMK) from the R-MSK received from the AG, and a Traffic Session Key (TSK) from the PMK. A Base Station (BS) sets up a radio connection to a Mobile Station (MS) using the TSK received from the SRNC, and performs radio communication using the set radio connection. The MS generates an MSK and an EMSK, and generates there from a D-MSK, a U-MSK, a DU-MSK, an R-MSK, a PMK, an SRK and a TSK, to perform radio communication with the BS.

8 Claims, 26 Drawing Sheets

METHOD AND APPARATUS FOR GENERATING SECURITY KEY IN A MOBILE COMMUNICATION SYSTEM

PRIORITY

This application claims priority under 35 U.S.C. §119(a) to Korean Patent Applications filed in the Korean Intellectual Property Office on May 14, 2007 and assigned Serial No. 2007-46308, and on Jun. 8, 2007 and assigned Serial No. 2007-56248, respectively, the contents of both of which are incorporated herein by reference.

BACKGROUND OF THE INVENTION

1. Field of the Invention

The present invention relates generally to a mobile communication system, and in particular, to a method and apparatus for performing authentication and security by a Mobile Node (MN) in a mobile communication network.

2. Description of the Related Art

In mobile communication systems such as Code Division Multiple Access (CDMA) 1× Evolution Data Only (EV-DO) defined by $3^{rd}$ Generation Partnership Project 2 (3GPP2), a Base Station (BS) controls many aspects of radio-related resources, and a Packet Data Serving Node (PDSN), which is a separate entity of the core network, performs a procedure related to communication of packet data.

Since the mobile communication system operates based on Point-to-Point Protocol (PPP), either Challenge Handshake Authentication Protocol (CHAP) or Password Authentication Protocol (PAP) is used as the framework for user/device authentication. However, these authentication methods are unsuitable in Ultra Mobile Broadband (UMB), which is an improved 3GPP2 scheme that aims to transmit more data at a higher speed. Therefore, an authentication and security scheme capable of more efficiently supporting UMB is now under discussion.

The authentication and security method used in the conventional CDMA 1×EV-DO system causes security problems in that it cannot completely block channel hijacking and prevent the fraudulent use of services without due payment. In addition, the conventional system cannot make a service denial against the message attack in both the Radio Frequency (RF) and the protocol levels. Therefore, there is a demand for a system and communication network capable of more secure communication.

Meanwhile, in providing mobility of an MN, the security method needs a long time to execute the security procedure despite its importance. In addition, since various security keys are used for the security, a method for systematically generating and managing these security keys is also needed for fast security setting and management.

SUMMARY OF THE INVENTION

An aspect of the present invention is to address at least the problems and/or disadvantages and to provide at least the advantages described below. Accordingly, an aspect of the present invention is to provide a method and apparatus for securely and efficiently generating security keys in device, user and service authentication in a mobile communication system.

According to the present invention, there is provided an apparatus for generating a security key in a mobile communication system that performs security key generation. The apparatus includes an Authentication, Authorization and Accounting (AAA) server for generating a Master Session Key (MSK) and an Extended MSK (EMSK) from a Long Term Credential key, and generating a Device-MSK (D-MSK), a User-MSK (U-MSK) and a Device and User-MSK (DU-MSK) from the MSK and the EMSK, an Access Gateway (AG) for generating a Root-MSK (R-MSK) from the MSK and EMSK received from the AAA server, a Signaling Radio Network Controller (SRNC) for generating a Pairwise Master Key (PMK) from the R-MSK received from the AG, and generating a Traffic Session Key (TSK) from the PMK, a Base Station (BS) for setting up a radio connection to a Mobile Station (MS) using the TSK received from the SRNC, and performing radio communication using the set radio connection, and the MS for generating an MSK and an EMSK, and generating therefrom a D-MSK, a U-MSK, a DU-MSK, an R-MSK, a PMK, an SRK and a TSK, to perform radio communication with the BS.

According to the present invention, there is provided a method for generating a security key in a mobile communication system. The method includes generating an MSK and an EMSK from a Long Term Credential key, generating and managing device and user authentication and session-related keys from the MSK and the EMSK, generating a Mobile IP Root Key (MIP-RK) and a Proxy Mobile IP Root Key (PMIP-RK) from the EMSK, and generating a key for operating Client Mobile IP (CMIP) and Proxy Mobile IP (PMIP), from the MIP-RK and the PMIP-RK.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
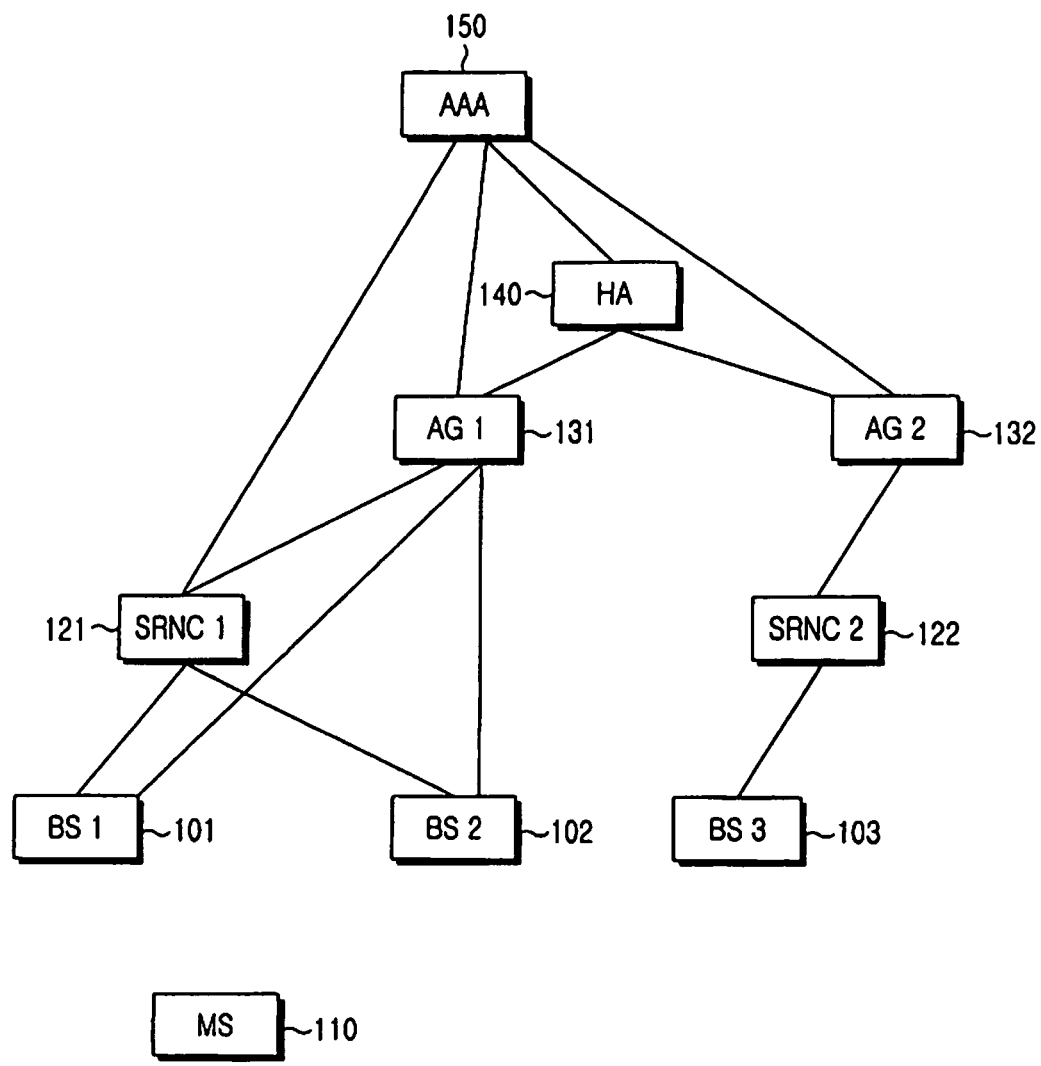
FIG. 1 illustrates a mobile communication network environment according to the present invention.

Preferred embodiments of the present invention will now be described in detail with reference to the annexed drawings. In the drawings, the same or similar elements are denoted by the same reference numerals even though they are depicted in different drawings. The matters defined in the description such as a detailed construction and elements are provided to assist in a comprehensive understanding of preferred embodiments of the invention. Accordingly, those of ordinary skill in the art will recognize that various changes and modifications of the embodiment described herein can be made without departing from the scope and spirit of the invention. Also, descriptions of well-known functions and constructions are omitted for the sake of clarity and conciseness. Terms used herein are defined based on functions in the present invention and may vary according to users, operators' intention or usual practices. Therefore, the definition of the terms should be made based on contents throughout the specification.

Although the names of entities defined by 3$^{rd}$ Generation Partnership Project (3GPP) which is the asynchronous mobile communication standard or by Dynamic Contents Delivery (DCD) of Open Mobile Alliance (OMA) which is an application standard organization for mobile stations will be used intact herein for convenience of a description of the present invention, the standards and the names defined thereby will not limit the scope of the present invention, and the present invention can be applied to any system having the similar technical background.

The main object of the present invention, as described below, is to provide authentication and security for a mobile communication network. While a detailed description of the present invention will be given herein for a UMB system based on 3GPP2, it will be understood by those skilled in the art that the disclosed authentication and security method for a mobile communication network can be applied to other mobile communication systems having the similar technical background and channel format with a slight modification without departing from the spirit and scope of the invention.

The present invention provides a security key generation method and apparatus for efficiently supporting device authentication and user authentication in an initial call setup process of a mobile communication system, efficiently supporting Mobile IP (MIP), Proxy Mobile IP (PMIP) and/or Simple IP terminals, and securely performing security authentication and IP services.

In addition, the present invention provides a security key generation method and apparatus for performing authentication and security using Extensible Authentication Protocol (EAP) in a PPP-free mobile communication network where PPP is not used.

FIG. 1 illustrates a mobile communication network environment according to the present invention. A network configuration of the 3GPP2 UMB system is shown herein by way of example.

Referring to FIG. 1, Base Stations (BSs) BS1 101, BS2 102 and BS3 103 each set up a radio connection to a Mobile Station (MS) 110 located in its own cell or service coverage, and perform communication through the radio connection. Signaling Radio Network Controllers (SRNCs) SRNC1 121 and SRNC2 122, when the MS 110 is in an idle mode, control communication of the MS 110 through the BS1 101, BS2 102 and BS3 103. The MS 110 accesses a packet data network such as the Internet over Access Gateways (AGs) AG1 131 and AG2 132. The major network entities of the packet data network, shown herein, include a Home Agent (HA) 140 and an Authentication, Authorization and Accounting (AAA) server 150. When the SRNC1 121 has an authenticator for device authentication, an SRNC for interfacing with the AAA 150 will be used for the device authentication.

Interfaces for managing mobility of terminals in the idle state exist between the BS1 101 and the SRNC1 121, and between the AG1 131 and the SRNC1 121, and a data path exists between the AG1 131 and the BS1 101. For authentication of the terminals, an authenticator (not shown) for device authentication is situated in the SRNC1 121 and an authenticator (also not shown) for device authentication is situated in the AG1 131. Alternatively, both the device authenticator and user authenticator can be included in any one of SRNC and AG. To perform such authentication, the AG1 131, AG2 132, SRNC1 121 and SRNC2 122 can be realized as one physical entity. Also, even when the AG1 131, AG2 132, SRNC1 121 and SRNC2 122 exist as independent physical entities, if proper interfaces are provided between the AG1 131, AG2 132, SRNC1 121 and SRNC2 122, then they can operate as if they are realized as one entity.

Figure 2:
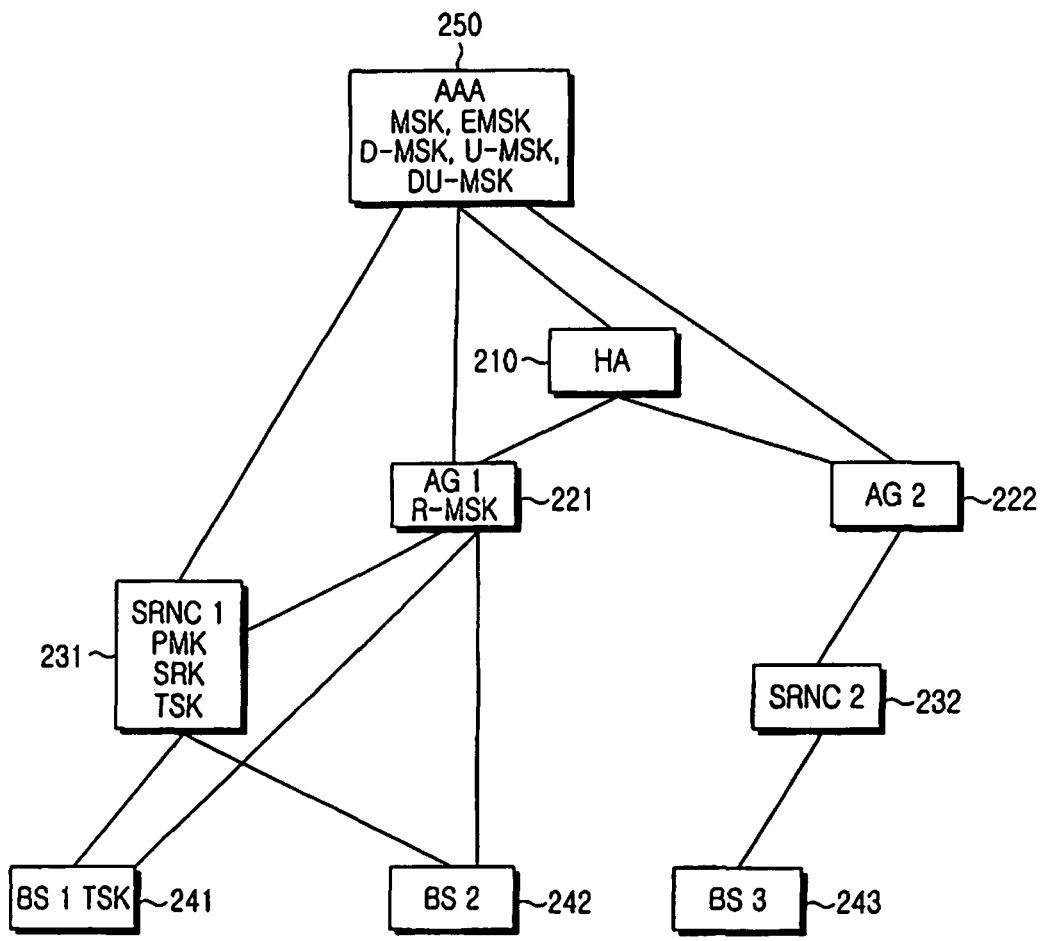
FIG. 2 illustrates a mobile communication network environment for a description of a security key generation entity according to the present invention.

FIG. 2 illustrates a mobile communication network environment for a description of a security key generation entity according to the present invention.

Shown in FIG. 2 is a preferred embodiment of the security key generation entity, and various modifications thereof are possible. A description of the modified embodiments will be given below with reference to FIGS. 3A to 11B. Further, the detailed key generation equations and methods will be described in the embodiments of FIGS. 3A to 11B.

In FIG. 2, an AAA 250 generates an MSK and an EMSK from a long-term authentication (also known as 'Long Term Credential'). The generated MSKs can be classified into a Device-MSK (D-MSK) used for device authentication and a User-MSK (U-MSK) used for user authentication, or a Device-User-MSK (DU-MSK) can be generated from the generated MSK. The D-MSK, U-MSK and DU-MSK are used when it is possible to perform only the device authentication, the user authentication, and both the device authentication and the user authentication, respectively, according to the policy of the service provider. In particular, when performing both the device and the user authentication, the AAA 250 manages the authentication operation with one security key rather than two separate security keys. As for a certain service provider, even though the AAA 250 carries out both the device and the user authentication, it can implement the authentication with only one of the two security keys according to the policy of the service provider.

Even an MS 210 generates and stores the MSK, EMSK, D-MSK, U-MSK and DU-MSK, and can further generate Root-MSK (R-MSK), Pairwise Master Key (PMK), Session Root Key (SRK), and Traffic Session Key (TSK). For the R-MSK, one key generation process is further added to solve the possible security problem, which may occur when after the AAA 250 transmits the generated U-MSK to an AG, the AG transmits the U-MSK intact to an SRNC. If generating the R-MSK by AG agrees with the policy of the service provider, even the MS can generate the R-MSK and use it later in generating the PMK.

The PMK is a key used for direct session management as PMK itself according to embodiments, and can be used for generating a data encryption-related key or for generation of the key (TSK) used for data integrity verification. The PMK can be generated in an SRNC and used for TSK generation in SRNC. Otherwise, the SRNC transmits the PMK to a BS, and the BS can generate, from the PMK, data encryption-related key or the TSK key for data integrity verification.

In another embodiment, the PMK can be used for generating the SRK when an SRNC generates the SRK and transmits it to a BS, rather than generating by the PMK itself the key for participating in the direct session management. In this case, a BS1 241 can participate in generating, from the SRK, data encryption-related key or the TSK key for data integrity verification. In another embodiment, the SRK may be simply used only for a 3-way handshake between the SRNC and the BS and/or MS, rather than for generating the TSK. The data encryption-related key and the key used for data integrity verification can include another key instead of the TSK, and the TSK is used herein by way of example.

An AG1 221 generates the R-MSK. An SRNC1 231 generates the PMK according to the policy of the service provider, and generates a TSK from the PMK. As further another embodiment, the SRNC1 231 can generate an SRK from the PMK, and transmit it to the BS1 241, and the BS1 241 can generate a TSK from the SRK. As further another embodiment, the BS1 241 can generate the TSK from the PMK received from the SRNC1 231.

With reference to FIGS. 3A to 11B, a description will now be made of various embodiments of the security key generation method.

Although the entity of generating keys in each embodiment can be the same as described in FIG. 2, it can be realized in a different manner according to the service provider. Therefore, the entity of performing each step of the method of each embodiment will be regarded as the entire communication network system, unless stated otherwise.

Figure 3A:
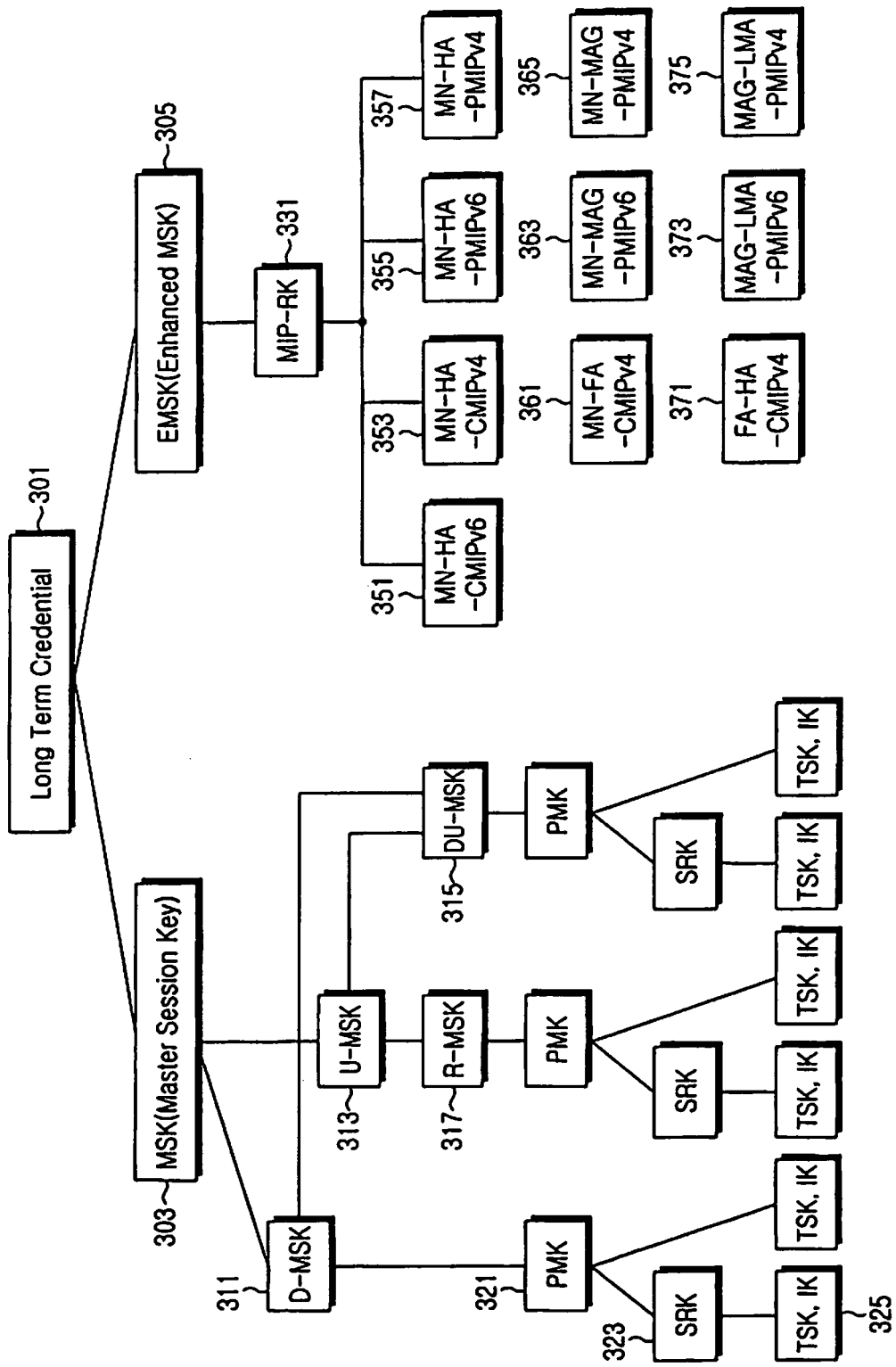
FIG. 3A illustrates a security key generation system based on MSK and EMSK according to a first embodiment of the present invention.
Figure 3B:
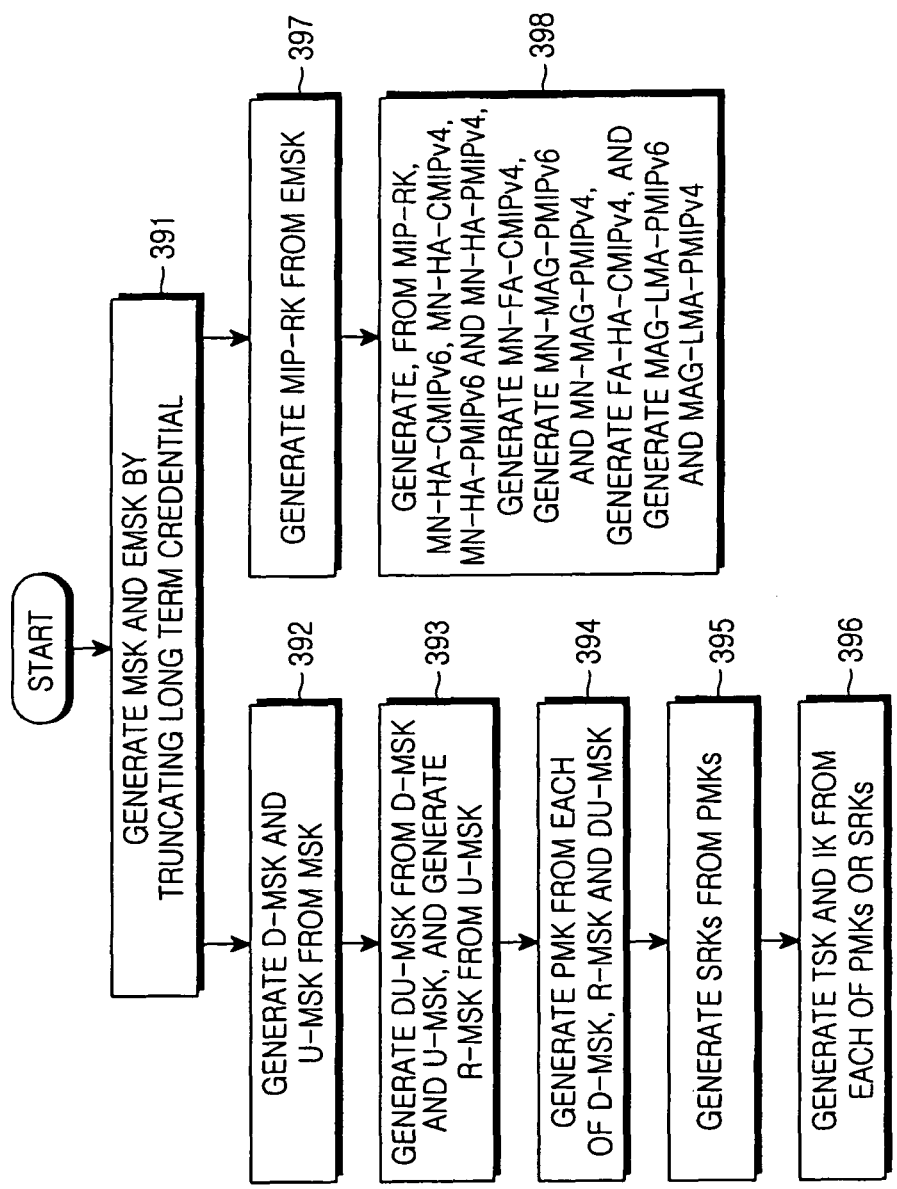
FIG. 3B illustrates a security key generation method based on MSK and EMSK according to the first embodiment of the present invention.

FIGS. 3A and 3B illustrate a security key generation system based on the MSK and the EMSK, and a flowchart illustrating a security key generation method according to a first embodiment of the present invention, respectively.

Referring to FIGS. 3A and 3B, if the MSK 303 and the EMSK 305 are generated from a Long Term Credential 301 of FIG. 3A in step 391 of FIG. 3B, the system can be roughly divided into two regions. One region is a block for generating/managing, from the MSK, device authentication keys 311 and 315 or user authentication keys 313, 315 and 317, and session-related keys 321 to 325. This corresponds to steps 392 to 396 of FIG. 3B. Another region generates, from the EMSK, a Mobile IP Root Key (MIP-RK) 331, from which a key for operating Client Mobile IPv6 (CMIPv6), Client Mobile IPv4 (CMIPv4), Proxy Mobile IPv6 (PMIPv6), and Proxy Mobile IPv4 (PMIPv4) is generated. This corresponds to steps 397 to 398 of FIG. 3B.

The Long Term Credential 301 is used for making long-term secrets between an authentication server and an MS, and either of a pre-shared key method and a public-key based method can be used for the Long Term Credential 301. In the latter case, Long Term Credential is generated as a private key. The MSK 303 is generated in a server and an EAP peer corresponding to an MS in the present invention, and the MSK should have a length of a minimum of 64 octets. The EMSK 305 has a length of a minimum of 64 octets, and its minimum length should be a size of the MSK. For the MSK and EMSK, a method is used that generally truncates Long Term Credential, uses a part of it as an MSK, and uses another part of it as an EMSK. However, another method of generating the MSK and EMSK can also be used, and a detailed description thereof will be omitted herein for the sake of conciseness.

In step 392 of FIG. 3B, a D-MSK 311 and/or a U-MSK 313 of FIG. 3A are generated by a MSK generation method, and for discrimination between the D-MSK and the U-MSK and for discrimination from the EMSK, the Long Term Credential can be randomly truncated in a predetermined length or a particular function (e.g., random function) can be used, but a description of its detailed method will be omitted herein for the sake of conciseness. However, since the Long Term Credential, as a parental number, is shared by the D-MSK, U-MSK and EMSK, a method should be used in which the Long Term Credential can undergo inverse tracking due to their generation, or other keys are not exposed by the relation between them. In step 393 of FIG. 3B, a DU-MSK 315 is generated using a Key Derivation Function (KDF) of Equation (1) from the D-MSK 311 and U-MSK 313 of FIG. 3A. However, this process is optional according to the service provider.

A detailed description of the function used in Equation (1) will be omitted herein. However, Equation (1) is as follows:

$$DU\text{-}MSK = KDF(D\text{-}MSK \text{ XOR } U\text{-}MSK, MS\_MAC\_Addr|\text{``DU-MSK''}) \quad (1)$$

Further, in step 393 of FIG. 3B, the R-MSK 317 of FIG. 3A can be generated from the U-MSK 313, and the R-MSK 317 can be generated in the form obtained by truncating the U-MSK 313 by a predetermined length, or can be generated using the KDF function of Equation (1). In step 395 of FIG. 3B, the PMK 321 of FIG. 3A is generated by truncating one of the D-MSK, U-MSK, DU-MSK and R-MSK by a set length. Considering that for the PMK 321, 32 octets are used in Wireless Local Area Network (LAN) and 20 octets are used in IEEE 802.16e, the PMK generation method, for UMB, can generate the PMK by taking a predetermined length from the MSK as described above, or can generate the PMK using the key generation function KDF. However, a detailed description of the key generation function will be omitted herein for the sake of conciseness.

The SRK 323 of FIG. 3A can be used for the same purpose as the PMK 321, and in step 395, it can be generated by taking a predetermined length from the PMK 321, or can be generated using the KDF function. However, this process is optional according to the service provider. In step 396 of FIG. 3B, the TSK or Integration Key (IK) 325 can be generated from the PMK 321 using a separate KDF function, or can be generated from the SRK 323 using a separate KDF function, and a detailed description of its generation method will be omitted herein for the sake of conciseness.

However, determining in step 396 from which one of the PMK 321 and the SRK 323 will be generated as the key used for data encryption or integrity such as TSK or IK is a factor affecting the entire security architecture, and this involves even the management of a handover situation where a terminal moves over the coverage of a BS, so it is related even to the development policy of the security architecture for the mobile communication system.

Meanwhile, in step 397 of FIG. 3B, an MIP-RK 331 can be generated from the EMSK 305 of FIG. 3A, and the MIP-RK 331 can be defined as the following Equation (2).

$$\text{MIP-RK} = \text{KDF}(\text{EMSK, key label, option data, length}) \quad (2)$$

A detailed example of Equation (2) can be expressed as the following Equation (3).

$$\text{MIP-RK} = \text{HMAC-SHA1}(\text{EMSK, "MIP-RK"}) \quad (3)$$

In Equation (3), HMAC-SHA1 denotes an HMAC-SHA1 function.

In step 398 of FIG. 3B, the keys corresponding to steps 351 to 375 of FIG. 3A are all generated from the MIP-RK.

MN-HA$_{CMIPv6}$ 351, MN-HA$_{CMIPv4}$ 353, MN-HA$_{PMIPv6}$ 355, and MN-HA$_{PMIPv4}$ 357 are generated in a Mobile Node (MN) and an AAA, and can be generated by the following Equations (4) to (7), respectively.

$$\text{MN-HA}_{CMIPv6} = \text{KDF}(\text{MIP-RK, "CMIPv6 MN HA"|HA-IPv6|MN-NAI}) \quad (4)$$

$$\text{MN-HA}_{CMIPv4} = \text{KDF}(\text{MIP-RK, "PMIPv4 MN HA"|HA-IPv4|MN-NAI}) \quad (5)$$

$$\text{MN-HA}_{PMIPv6} = \text{KDF}(\text{MIP-RK, "PMIPv6 MN HA"|HA-IPv6|MN-NAI}) \quad (6)$$

$$\text{MN-HA}_{PMIPv4} = \text{KDF}(\text{MIP-RK, "PMIPv4 MN HA"|HA-IPv4|MN-NAI}) \quad (7)$$

In Equations (4) to (7), an HMAC-SHA1 can be used as an example of KDF. In Equations (4) to (7), an MN-NAI may not be used as input data of the functions.

The MN-FA$_{CMIPv4}$ 361 is generated between an MN and a Foreign Agency (FA), and MN-MAG$_{PMIPv6}$ 363 and MN-MAG$_{PMIPv4}$ 365 are generated in an MN and a Mobile Access Gateway (MAG). These can be generated using Equations (8) to (10), respectively.

However, in one possible embodiment, since FA is situated in AG an MN-FA$_{CMIPv4}$ 361 can be situated in the MN and the AG. In another embodiment, since the MAG can be situated in the AG, the MN-MAG$_{PMIPv6}$ 363 and the MN-MAG$_{PMIPv4}$ 365 can be situated in the MN and the AG.

In further another embodiment, since the MAG can be situated in the BS, the MN-MAG$_{PMIPv6}$ 363 and the MN-MAG$_{PMIPv4}$ 365 can be situated in the MN and the BS. In Equations (8) to (10), $$\text{MN-FA}_{CMIPv4} = \text{KDF}(\text{MIP-RK, "CMIPv4 MN FA"|FA-IPv4|MN-NAI}) \quad (8)$$

$$\text{MN-MAG}_{PMIPv6} = \text{KDF}(\text{MIP-RK, "PMIPv6 MN MAG"|MAG-IPv6|MN-NAI}) \quad (9)$$

$$\text{MN-MAG}_{PMIPv4} = \text{KDF}(\text{MIP-RK, "PMIPv4 MN MAG"|MAG-IPv4|MN-NAI}) \quad (10)$$

In Equations (8) to (10), the HMAC-SHA1 can be used as an example of the KDF. Further, in Equation (8), the MN-NAI may not be used as input data of the functions.

The FA-HA$_{CMIPv4}$ 371 is generated in the FA and the AAA, and the MAG-LMA$_{PMIPv6}$ 373 and MAG-LMA$_{PMIPv4}$ 375 are generated MAG and Local Mobility Anchor (LMA). These can be generated from Equations (11) to (13), respectively. In one possible embodiment, since the FA is situated in the AG, the FA-HA$_{CMIPv4}$ 371 can be situated in the AG and the AAA. In another embodiment, since the MAG can be situated in the AG, and the LMA can be situated in the HA, the MAG-LMA$_{PMIPv6}$ 373 and MAG-LMA$_{PMIPv4}$ 375 can be situated in the AG and the AAA. Meanwhile, in further another possible embodiment, when the MAG is situated in the BS, the MAG-LMA$_{PMIPv6}$ 373 and MAG-LMA$_{PMIPv4}$ 375 can be situated in the BS and the AAA. In Equations (11) to (13), $$\text{FA-HA}_{CMIPv4} = \text{KDF}(\text{MIP-RK, "CMIPv4 FA HA"|HA-IPv4|FA-CoAv4|Nonce}) \quad (11)$$

$$\text{MAG-LMA}_{PMIPv6} = \text{KDF}(\text{MIP-RK, "PMIPv6 MAG LMA|LMA-IPv6|MAG-Address|Nonce}) \quad (12)$$

$$\text{MAG-LMA}_{PMIPv4} = \text{KDF}(\text{MIP-RK, "PMIPv4 MAG, LMA|LMA-IPv4|MAG-Address|Nonce}) \quad (13)$$

In Equations (11) to (13), the HMAC-SHA1 can be used as an example of the KDF. In Equation (11), the FA-CoAv4 and Nonce may not be used as input data of the function. Further, in Equations (12) and (13), the MAG-Address and Nonce may not be used as input data of the functions. Herein, the reason for using FA-CoAv4, MAG-Address, or Nonce is to specify between which the FA and the HA the security association exists, or between which the MAG and the LMA the security association exists, because a plurality of security associations can be made between the FA and the HA or between the MAG and the LMA. In addition, a Nonce value can be used to distinguish the multiple values.

Figure 4A:
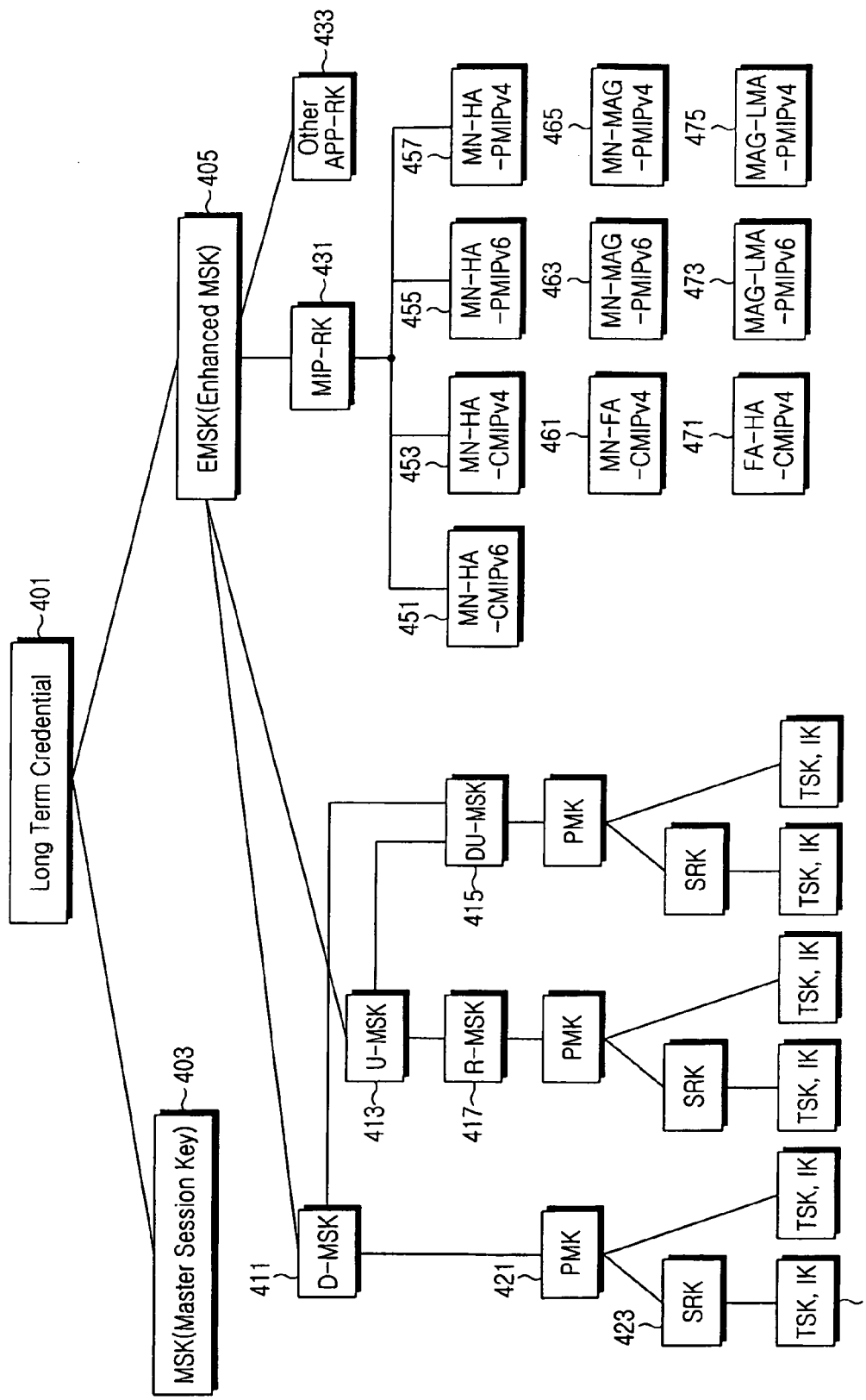
FIG. 4A illustrates a security key generation system based on EMSK according to a second embodiment of the present invention.
Figure 4B:
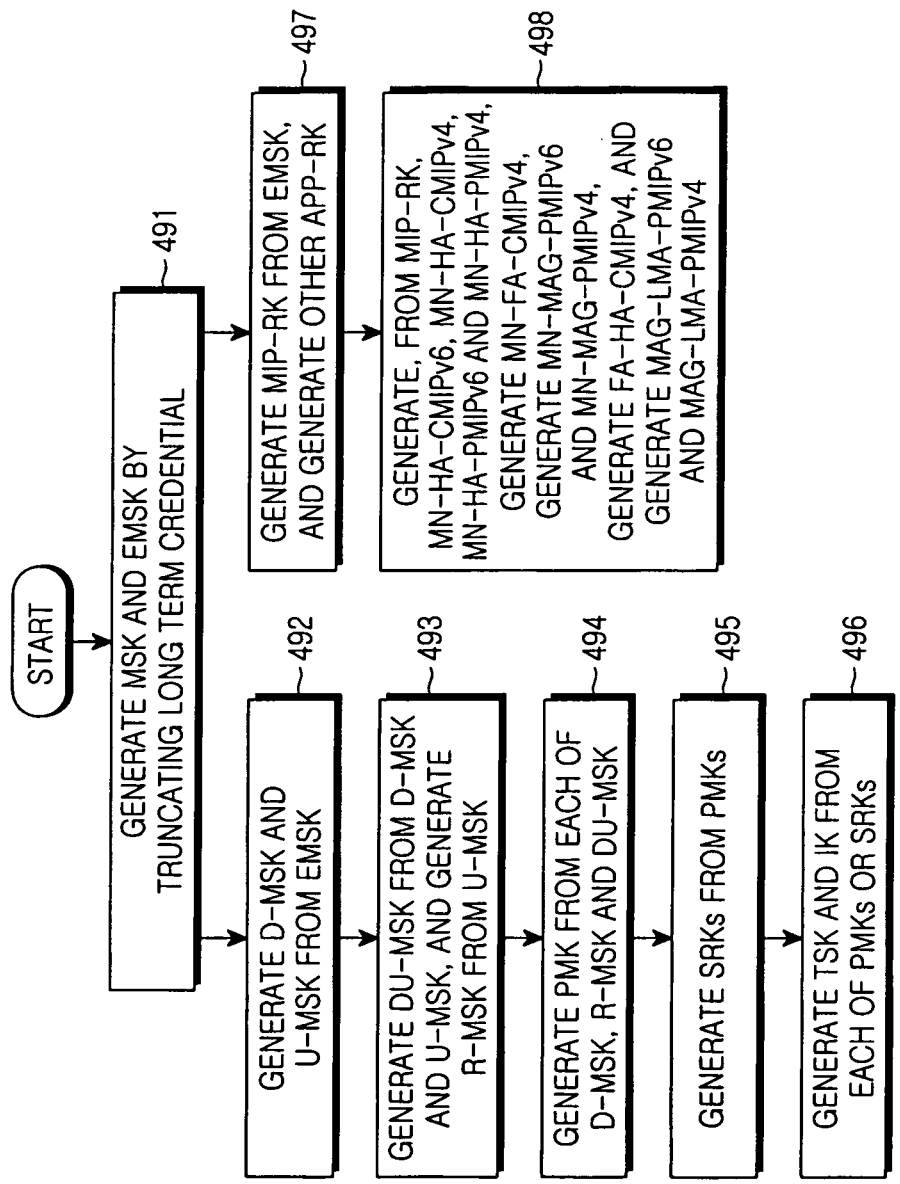
FIG. 4B illustrates a security key generation method based on EMSK according to the second embodiment of the present invention.

FIGS. 4A and 4B illustrate a security key generation system based on an EMSK, and a flowchart illustrating a security key generation method according to a second embodiment of the present invention, respectively.

Although it is shown in FIG. 4A that the MSK 403 and the EMSK 405 are generated from a Long Term Credential 401, FIG. 4A is different from FIG. 3A in that the MSKs to be used later, i.e., D-MSK 411, U-MSK 413, MIP-RK 431, and other Application-RK (APP-RK) 433 are all generated from the EMSK 405.

That is, in step 492, the D-MSK and U-MSK are generated not from MSK but from EMSK, using Equations (14) and (15), as follows:

$$\text{D-MSK} = \text{KDF}(\text{EMSK, key label, option data, length}) \quad (14)$$

$$\text{U-MSK} = \text{KDF}(\text{EMSK, key label, option data, length}) \quad (15)$$

Since steps 493 to 496 of FIG. 4B are the same as steps 393 to 396 of FIG. 3B, a detailed description thereof will be omitted herein.

Meanwhile, in step 497, the MIP-RK as well as the APP-RK are generated from the EMSK, using Equations (16) and (17), as follows:

$$\text{MIP-RK}=\text{KDF}(\text{EMSK, key label, option data, length}) \quad (16)$$

$$\text{APP-RK}=\text{KDF}(\text{EMSK, key label, option data, length}) \quad (17)$$

In Equations (14) to (17), a KDF is defined as a Pseudo Random Function (PRF). Since step 498 of FIG. 4B is to the same as step 398 of FIG. 3B, a detailed description thereof will be omitted herein.

Figure 5A:
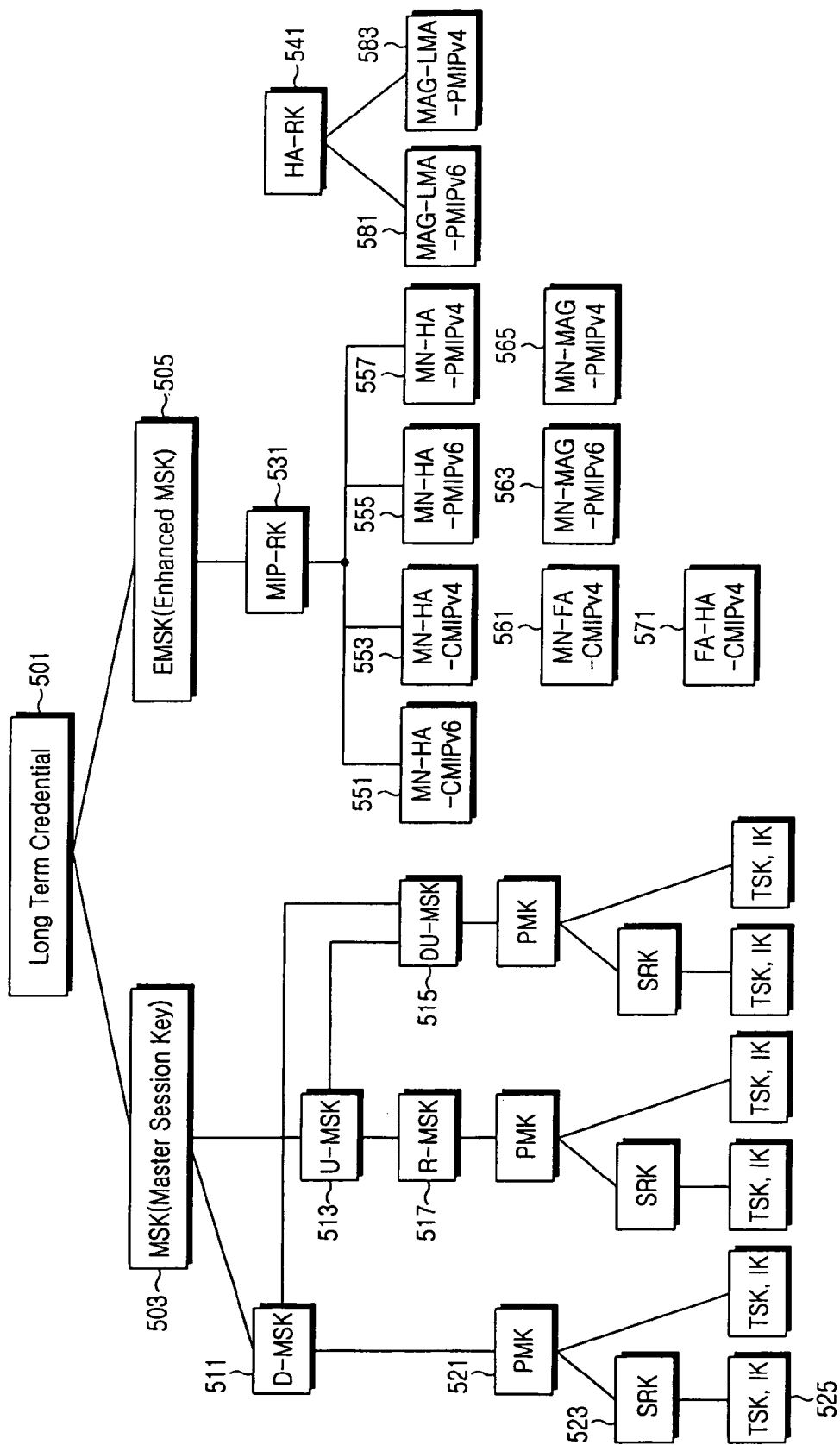
FIG. 5A illustrates a security key generation system based on MSK, EMSK and HA-RK according to a third embodiment of the present invention.
Figure 5B:
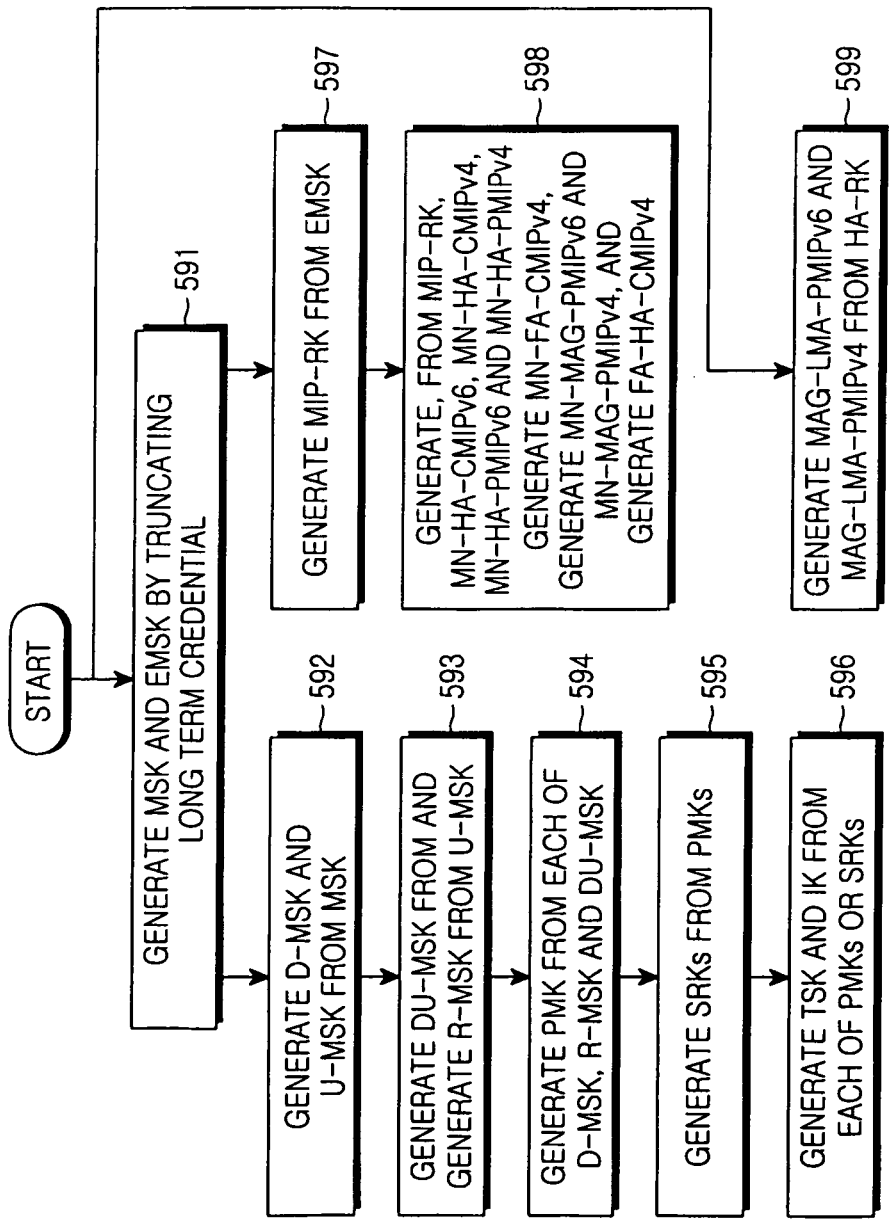
FIG. 5B illustrates a security key generation method based on MSK, EMSK and HA-RK according to the third embodiment of the present invention.

FIGS. 5A and 5B illustrate a security key generation system based on the MSK, EMSK and HA-RK, and a flowchart illustrating a security key generation method according to a third embodiment of the present invention, respectively. A description of the third embodiment will be given below only to the extent of its difference from the foregoing embodiments.

Although the third embodiment is basically similar to the key generation method of the first embodiment, the third embodiment is different in that it generates a MAG-LMA key 581 not from the MIP-RK 531, but from an HA-RK 541. In this manner, as the HA-RK 541 is generated by the AAA rather than generated depending on the MIP-RK 531, it can be used when the AAA intends to assign HA. Therefore, this method can be used for an intention to assign an HA which does not exist depending on a particular MIP session, and a key according thereto. The HA-RK 541 is randomly generated in the AAA, and its length will not be specified herein.

Referring to FIG. 5B, in step 599, an MAG-LMA$_{PMIPv6}$ 581 and an MAG-LMA$_{PMIPv4}$ 583 can be derived from Equations (18) and (19), respectively, as follows:

$$\text{MAG-LMA}_{PMIPv6}=\text{KDF}(\text{HA-RK, "PMIPv6 MAG LMA"}|\text{LMA-IPv6}|\text{MAG-Address}|\text{Nonce}) \quad (18)$$

$$\text{MAG-LMA}_{PMIPv4}=\text{KDF}(\text{HA-RK, "PMIPv4 MAG, LMA"}|\text{LMA-IPv4}|\text{MAG-Address}|\text{Nonce}) \quad (19)$$

In Equations (18) and (19), a function such as HMAC-SHA1 can be used as an example of a KDF. In Equations (18) and (19), MAG-Address and Nonce may not be used as an input value. A Security Parameter Index (SPI) of the HA-RK 541 can be used instead of Nonce.

Figure 6A:
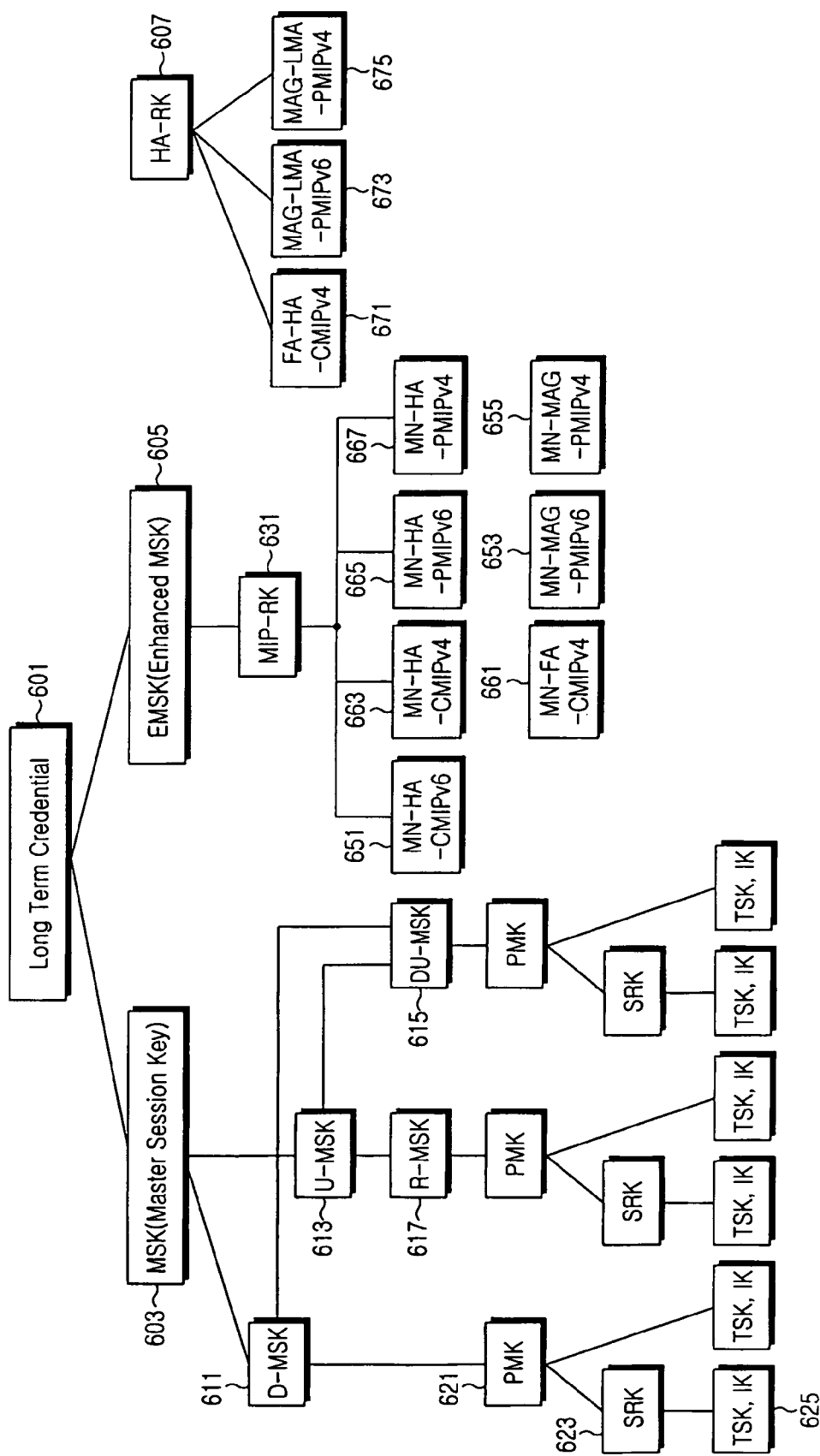
FIG. 6A illustrates a security key generation system based on MSK, EMSK and HA-RK according to a fourth embodiment of the present invention.
Figure 6B:
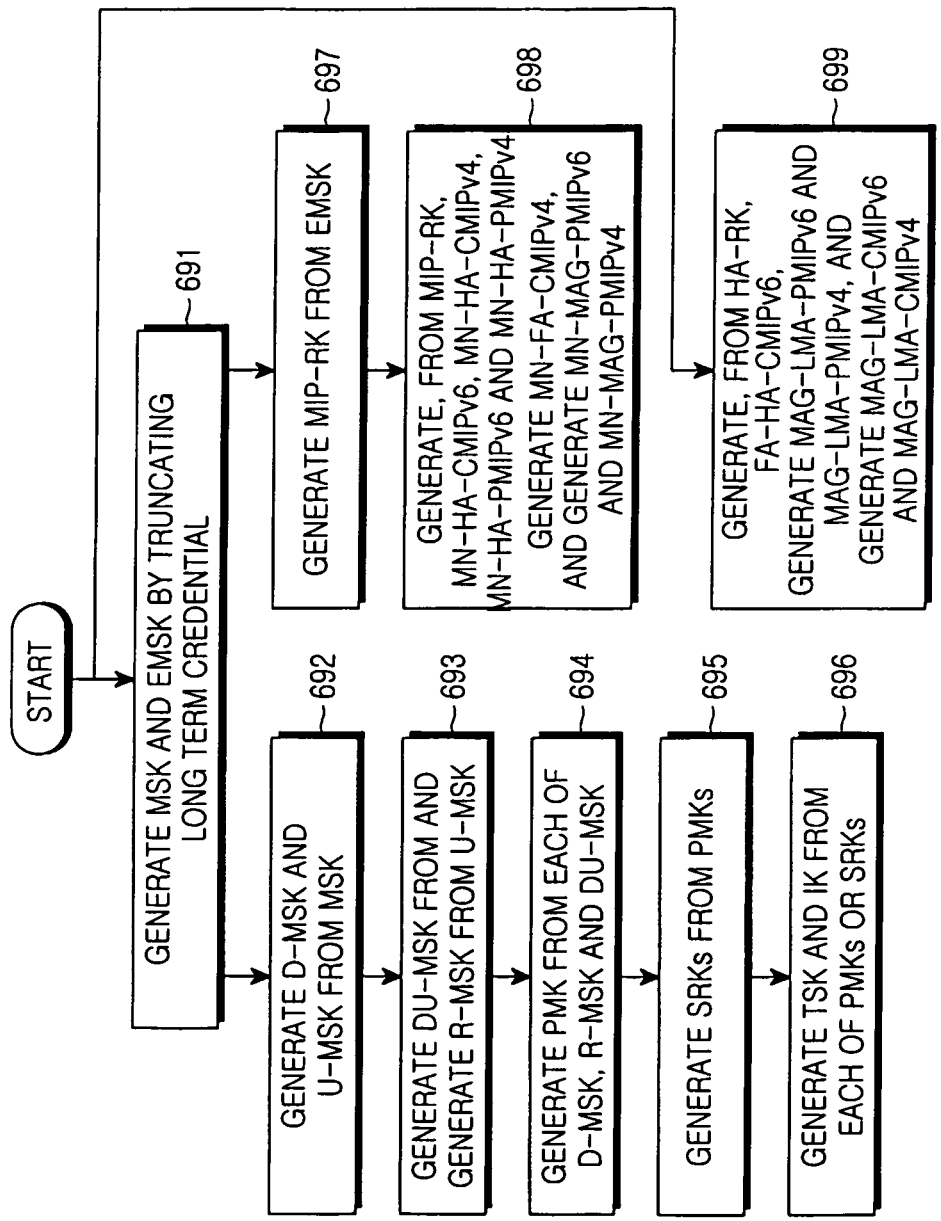
FIG. 6B illustrates a security key generation method based on MSK, EMSK and HA-RK according to the fourth embodiment of the present invention.

FIGS. 6A and 6B illustrate a security key generation system based on the MSK, EMSK and HA-RK, and a flowchart illustrating a security key generation method according to a fourth embodiment of the present invention, respectively. A description of the fourth embodiment will be given below only to the extent of its difference from the third embodiment.

The fourth embodiment, unlike the third embodiment, generates even FA-HA$_{CMIPv4}$ 671 from HA-RK 607 in step 699, using Equation (20) as follows:

$$\text{FA-HA}_{CMIPv4}=\text{KDF}(\text{HA-RK, "CMIPv4 FA HA"}|\text{HA-IPv4}|\text{FA-CoAv4}|\text{Nonce}) \quad (20)$$

In Equation (20), a function such as HMAC-SHA1 can be used as an example of a KDF. In Equation (20), the FA-CoAv4 and Nonce may not be used as an input value. An SPI value of the HA-RK 607 can be used instead of Nonce.

Figure 7A:
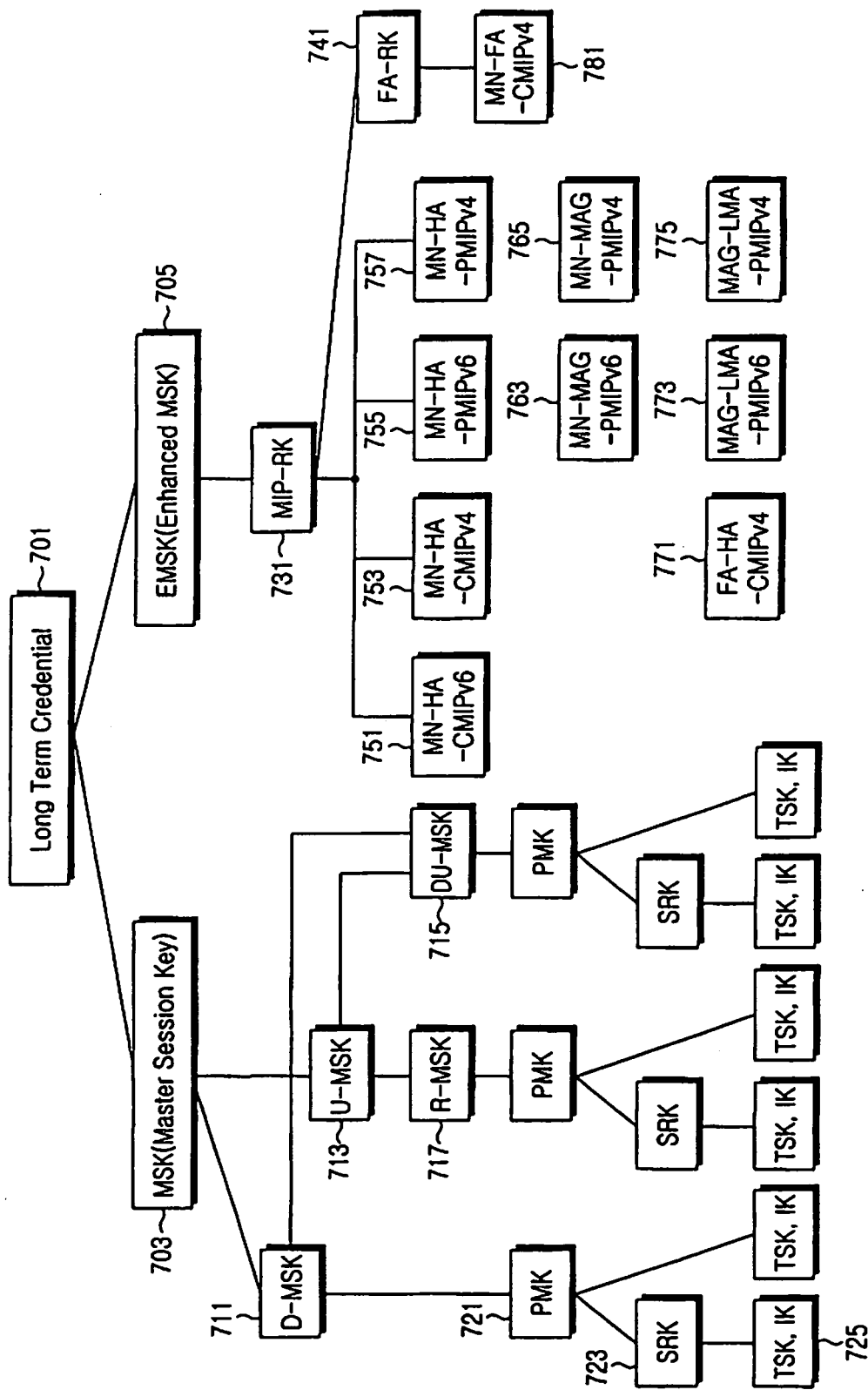
FIG. 7A illustrates a security key generation system based on MSK, EMSK and FA-RK according to a fifth embodiment of the present invention.
Figure 7B:
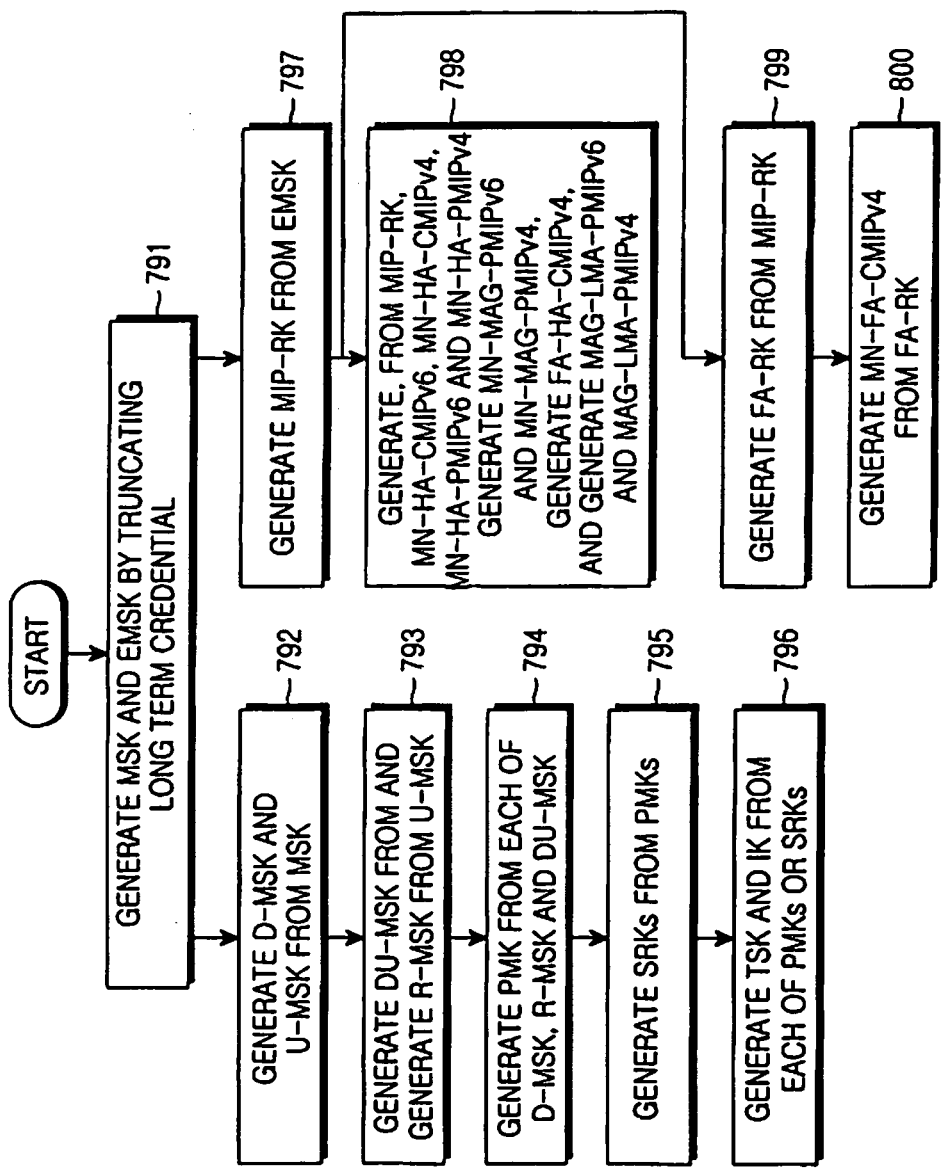
FIG. 7B illustrates a security key generation method based on MSK, EMSK and FA-RK according to the fifth embodiment of the present invention.

FIGS. 7A and 7B illustrate a security key generation system based on the MSK, EMSK and FA-RK, and a flowchart illustrating a security key generation method according to a fifth embodiment of the present invention, respectively. A description of the fifth embodiment will be given below only to the extent of its difference from the first embodiment.

The fifth embodiment is different from the first embodiment in that it derives/generates an MN-FA key 781 from an FA-Root key (FA-RK) 741. That is, the FA-RK is generated from the MIP-RK in step 799, and the MN-FA key 781 is generated from the FA-RK 741 in step 800. In this manner, the FA-RK concept has been introduced to use the FA-RK 741 as a root key in order to acquire a new FA without a re-authentication process in the handover situation, and these keys are derived using Equations (21) and (22), respectively, as follows:

$$\text{FA-RK}=\text{KDF}(\text{MIP-RK, "CMIPv4 FA RK"}) \quad (21)$$

$$\text{MN-FA}_{CMIPv4}=\text{KDF}(\text{FA-RK, "CMIPv4 MN FA"}|\text{FA-IPv4}|\text{MN-NAI}) \quad (22)$$

In Equations (21) and (22), a function such as HMAC-SHA1 can be used as an example of the KDF. In Equation (22), MN-NAI may not be used as input data of the functions.

Figure 8A:
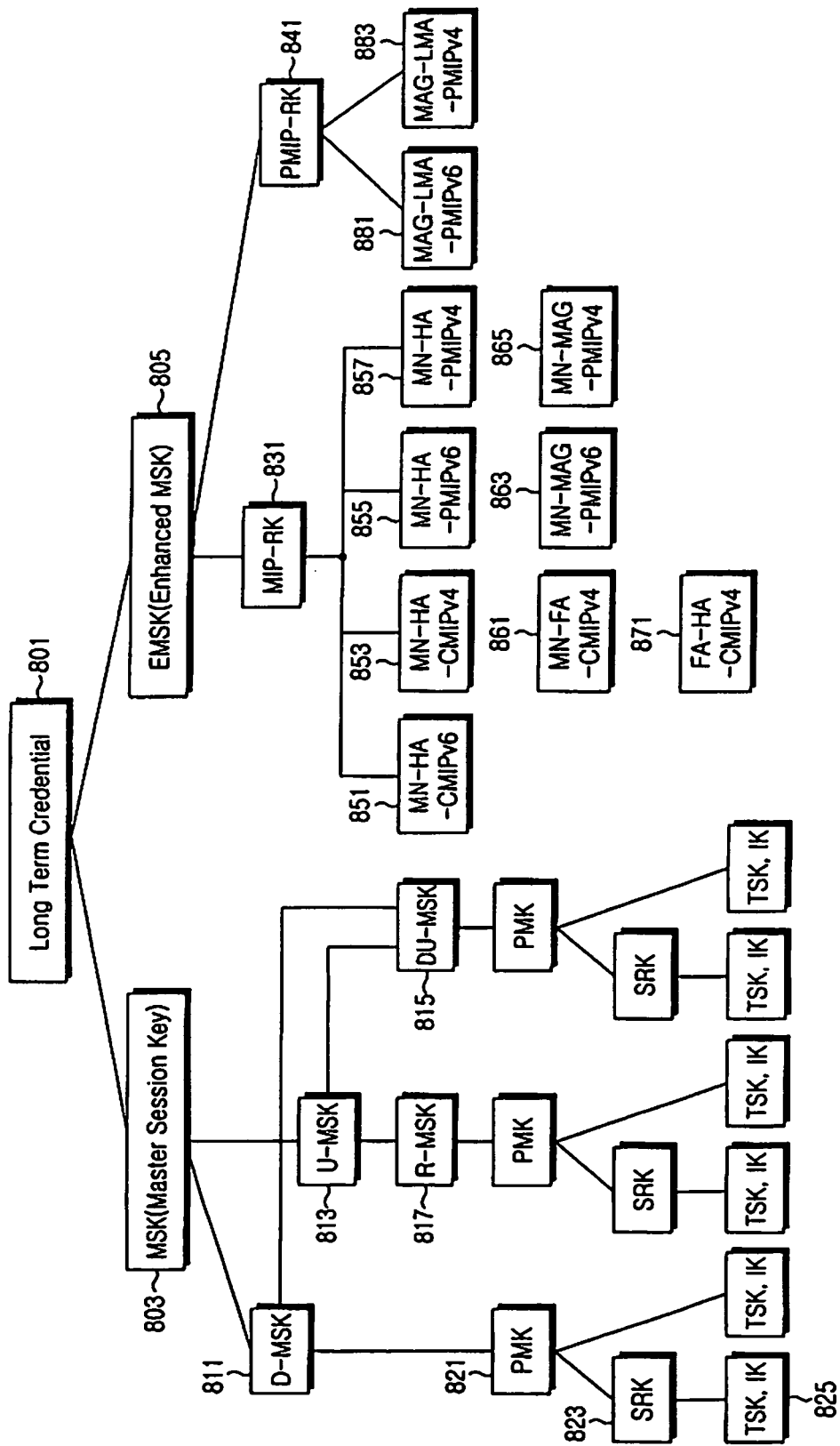
FIG. 8A illustrates a security key generation system based on MSK, EMSK and PMIP-RK according to a sixth embodiment of the present invention.
Figure 8B:
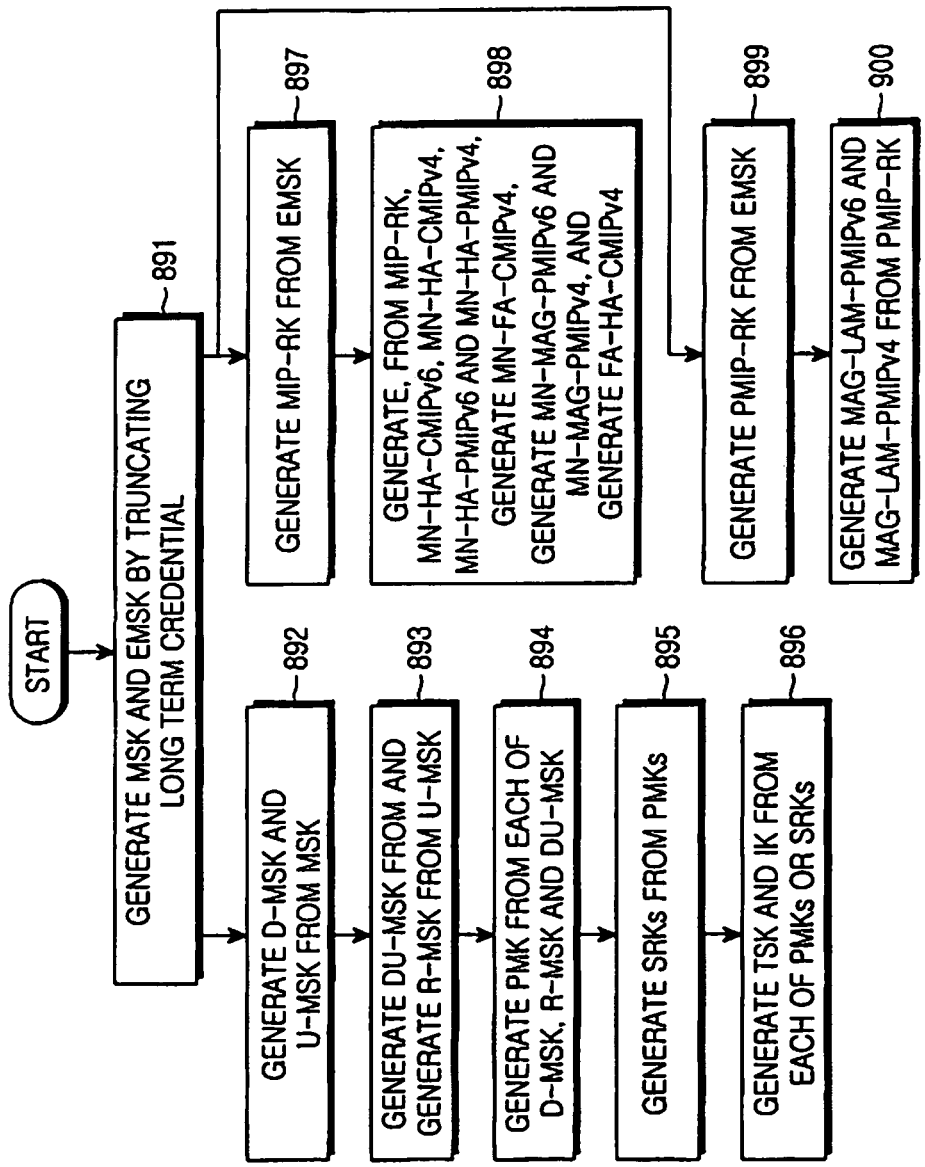
FIG. 8B illustrates a security key generation method based on MSK, EMSK and PMIP-RK according to the sixth embodiment of the present invention.

FIGS. 8A and 8B illustrate a security key generation system based on the MSK, EMSK and PMIP-RK, and a flowchart illustrating a security key generation method according to a sixth embodiment of the present invention, respectively. A description of the sixth embodiment will be given below only to the extent of its difference from the first embodiment.

The sixth embodiment, unlike the first embodiment, can generate a Proxy Mobile IP-RK (PMIP-RK) 841 from the EMSK 805. In step 899, the PMIP-RK can be generated using Equation (23), as follows:

$$\text{PMIP-RK}=\text{KDF}(\text{EMSK, key label, option data, length}) \quad (23)$$

A detailed example of Equation (23) can be given as Equation (24), as follows:

$$\text{PMIP-RK}=\text{KDF}(\text{EMSK, "PMIP-RK"}) \quad (24)$$

In Equation (24), KDF is defined as PRF.

Meanwhile, in step 897, the MIP-RK 831 can be generated from the EMSK 805, and the MIP-RK 831 can be defined as the following Equation (25).

$$\text{MIP-RK}=\text{KDF}(\text{EMSK, key label, option data, length}) \quad (25)$$

A detailed example of Equation (25) can be given as the following Equation (26).

$$\text{MIP-RK}=\text{KDF}(\text{EMSK, "MIP-RK"}) \quad (26)$$

In Equation (26), KDF is defined as a PRF.

In step 900, a MAG-LMA$_{PMIPv6}$ 881 and MAG-LMA$_{PMIPv4}$ 883 can be derived from the PMIK-RK using Equations (27) and (28), as follows:

$$\text{MAG-LMA}_{PMIPv6}=\text{KDF}(\text{PMIP-RK, "PMIPv6 MAG LMA}|\text{LMA-IPv6 MAG-Address}|\text{Nonce}) \quad (27)$$

$$\text{MAG-LMA}_{PMIPv4}=\text{KDF}(\text{PMIP-RK, "PMIPv4 MAG LMA}|\text{LMA-IPv4 MAG-Address}|\text{Nonce}) \quad (28)$$

In Equations (27) and (28), a function such as HMAC-SHA1 can be used as an example of KDF.

Figure 9A:
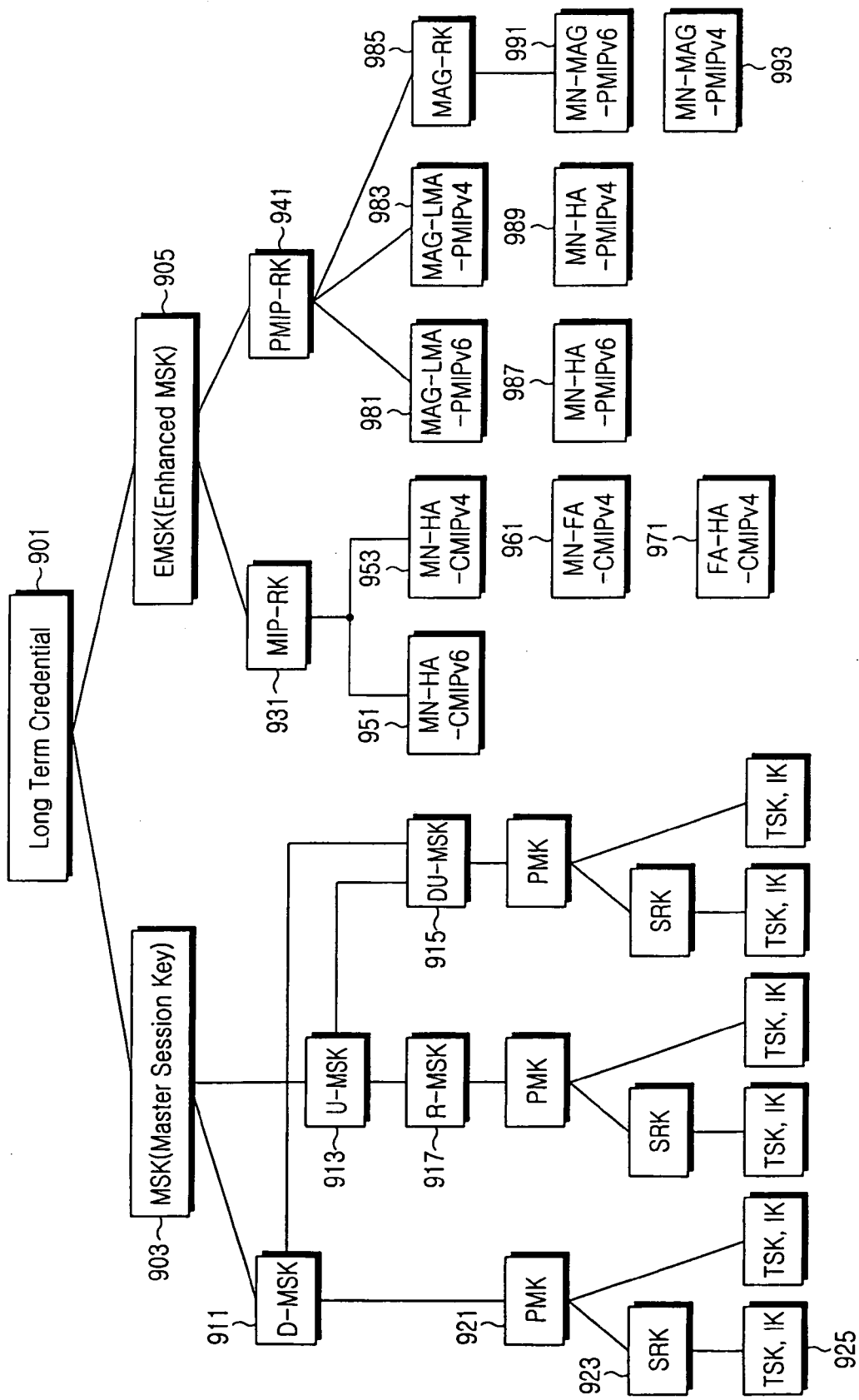
FIG. 9A illustrates a security key generation system based on MSK, EMSK, PMIP-RK and MAG-RK according to a seventh embodiment of the present invention.
Figure 9B:
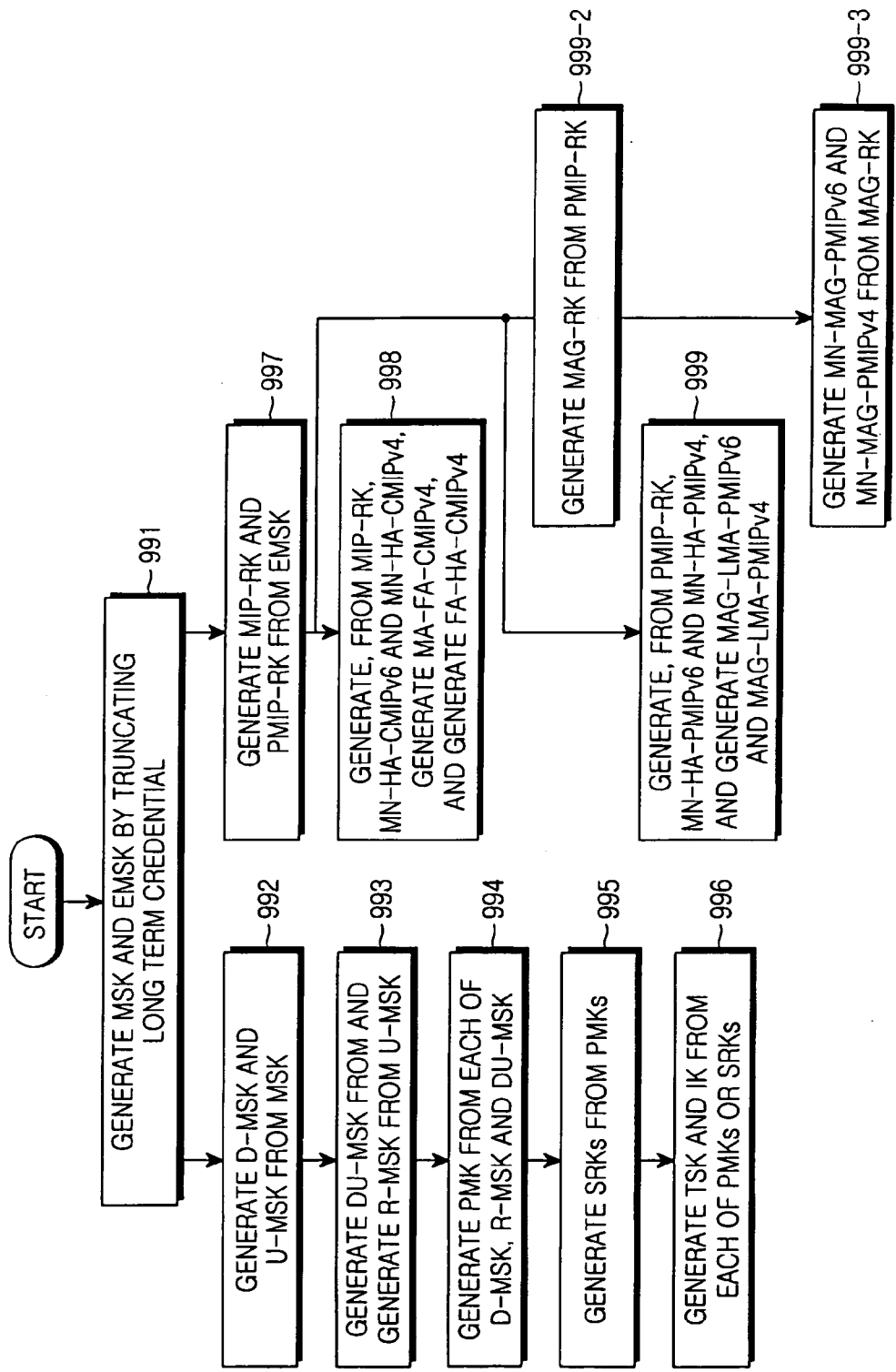
FIG. 9B illustrates a security key generation method based on MSK, EMSK, PMIP-RK and MAG-RK according to the seventh embodiment of the present invention.

FIGS. 9A and 9B illustrate a security key generation system based on the MSK, EMSK, PMIP-RK and MAG-RK, and a flowchart illustrating a security key generation method according to a seventh embodiment of the present invention, respectively. Since the seventh embodiment is basically to the same as the sixth embodiment, a description thereof will be given below only to the extent of its difference from the sixth embodiment.

The seventh embodiment generates an MAG-LMA$_{PMIPv6}$ 981 and MAG-LMA$_{PMIPv4}$ 983 from the PMIP-RK 941 as described in FIGS. 8A and 8B, and can further generate an MAG-RK 985. In addition, the seventh embodiment shows an example capable of generating even the MN-HA$_{\text{-}PMIPv6}$ 987 and MN-HA$_{\text{-}PMIPv4}$ 989 from the PMIP-RK, and such an example can be used for an intention to separately provide the PMIP-RK for the MIP and the PMIP. On the other hand, the MN-MAG$_{\text{-}PMIPv6}$ 991 and MN-MAG$_{\text{-}PMIPv4}$ key 993 can be derived from the MAG-RK 985. These are calculated using Equations (29) to (33), respectively, as follows:

MN-HA PMIPv6=KDF(PMIP-RK, "PMIPv6 MN
  HA"|HA-IPv6|MN-NAI)  (29)

MN-HA PMIPv4=KDF(PMIP-RK, "PMIPv4 MN
  HA"|HA-IPv4|MN-NAI)  (30)

MAG-RK=KDF(PMIP-RK, "PMIPv4 MAG RK")  (31)

MN-MAG$_{\text{-}PMIPv6}$=KDF(MAG-RK, "PMIPv6 MN
  MAG"|MAG-IPv6|MN-NAI)  (32)

MN-MAG$_{\text{-}PMIPv4}$=KDF(MAG-RK, "PMIPv4 MN
  MAG"|MAG-IPv4|MN-NAI)  (33)

In Equations (29) to (33), a function such as HMAC-SHA1 can be used as an example of the KDF. In Equations (29) to (33), NN-NAI may not be used as input data of the functions.

Figure 10A:
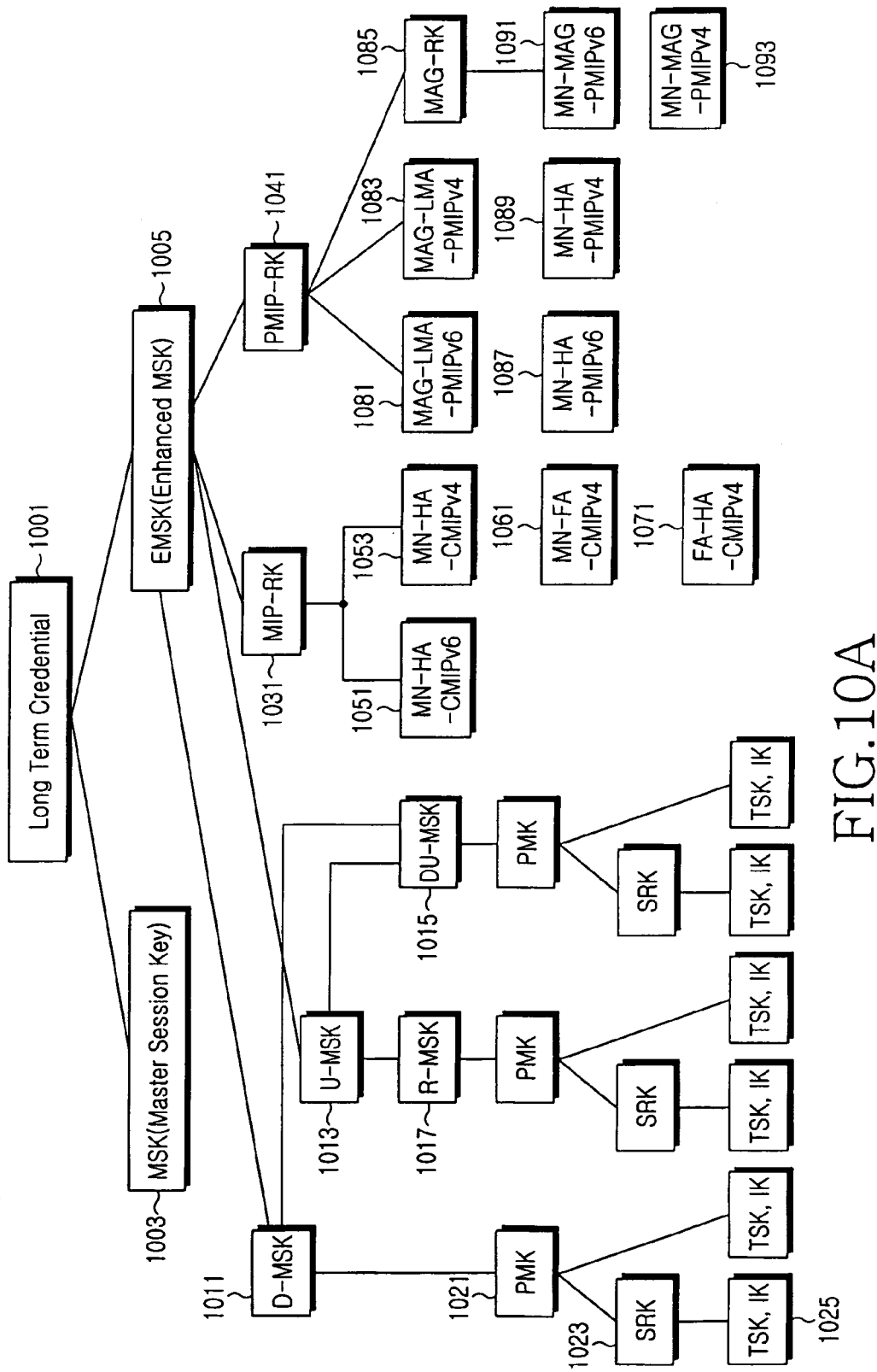
FIG. 10A illustrates a security key generation system based on EMSK, MIP-RK, PMIP-RK and MAG-RK according to an eighth embodiment of the present invention.
Figure 10B:
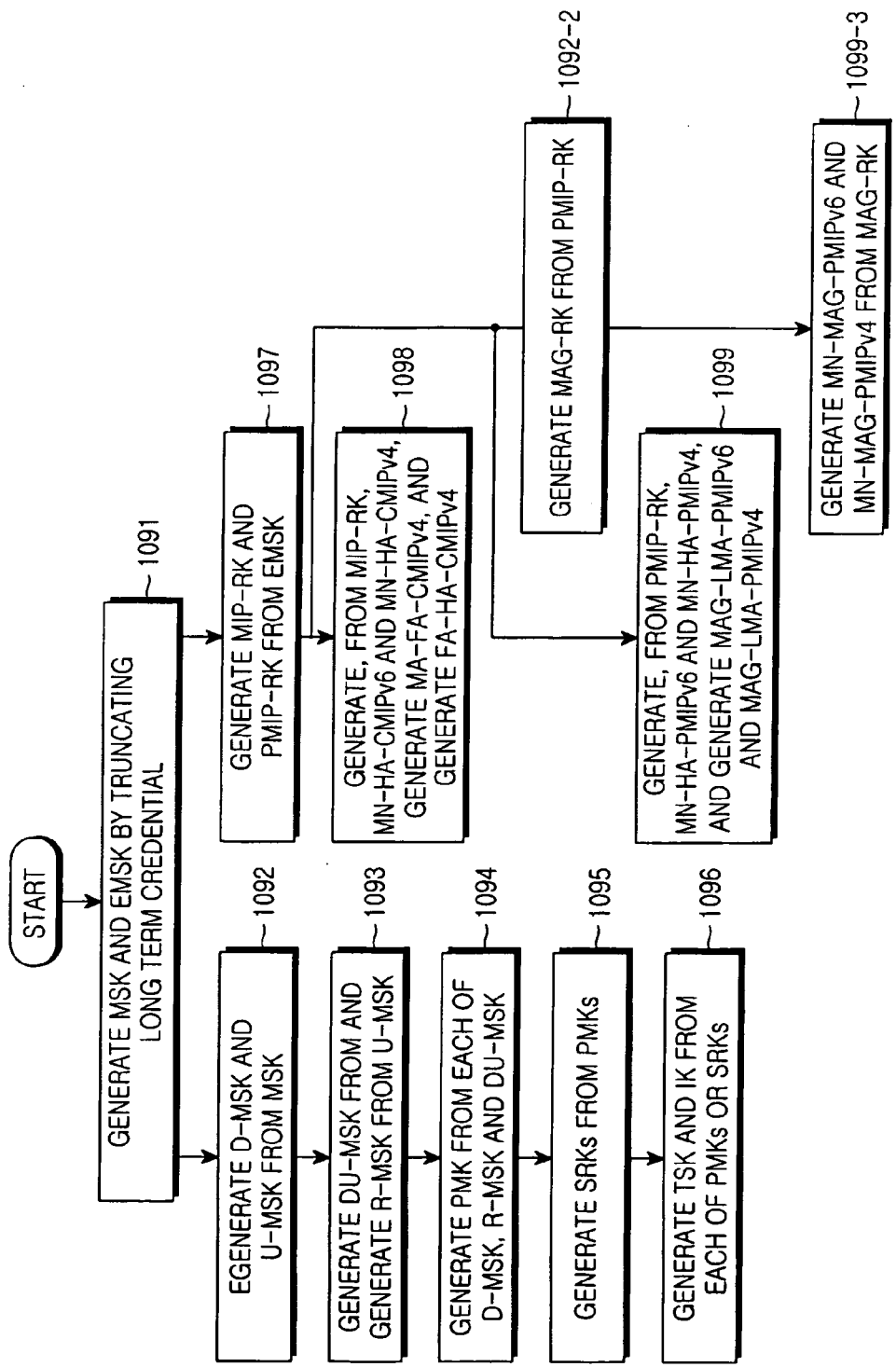
FIG. 10B illustrates a security key generation method based on EMSK, MIP-RK, PMIP-RK and MAG-RK according to the eighth embodiment of the present invention.

FIGS. 10A and 10B illustrate a security key generation system based on the EMSK, MIP-RK, PMIP-RK and MAG-RK, and a flowchart illustrating a security key generation method according to an eighth embodiment of the present invention, respectively. Since the eighth embodiment is basically the same as the seventh embodiment, a description thereof will be given below only to the extent of its difference from the seventh embodiment.

Although it is shown in FIG. 10A that the MSK 1003 and the EMSK 1005 are generated from a Long Term Credential 1001, FIG. 10A is different from FIG. 9A in that the MSKs to be used later, i.e., D-MSK 1011, U-MSK 1013, MIP-RK 1031 and PMIP-RK 1041 are all generated from the EMSK 1005. Therefore, FIG. 10B is different from FIG. 9B in that D-MSK and U-MSK are generated from the EMSK in step 1092.

That is, in step 1092, the D-MSK and U-MSK are generated not from the MSK, but from the EMSK, using Equations (34) and (35), respectively, as follows:

D-MSK=KDF(EMSK, key label, option data, length)  (34)

U-MSK=KDF(EMSK, key label, option data, length)  (35)

Since steps 1093 to 1096 of FIG. 10B are to the same as steps 993 to 996 of FIG. 9B, a detailed description thereof will be omitted herein.

Meanwhile, the PMIP-RK 1041 can be generated from the EMSK 1005. In step 1097, the PMIP-RK 1041 and MIP-RK 1031 can be generated using Equations (36) and (37), respectively, as follows:

PMIP-RK=KDF(EMSK, key label, option data,
  length)  (36)

MIP-RK=KDF(EMSK, key label, option data, length)  (37)

Detailed examples of Equations (36) and (37) can be given as Equations (38) and (39), respectively, as follows:

PMIP-RK=KDF(EMSK, "PMIP-RK")  (38)

MIP-RK=KDF(EMSK, "MIP-RK")  (39)

In Equations (38) and (39), KDF is defined as PRF.

Figure 11A:
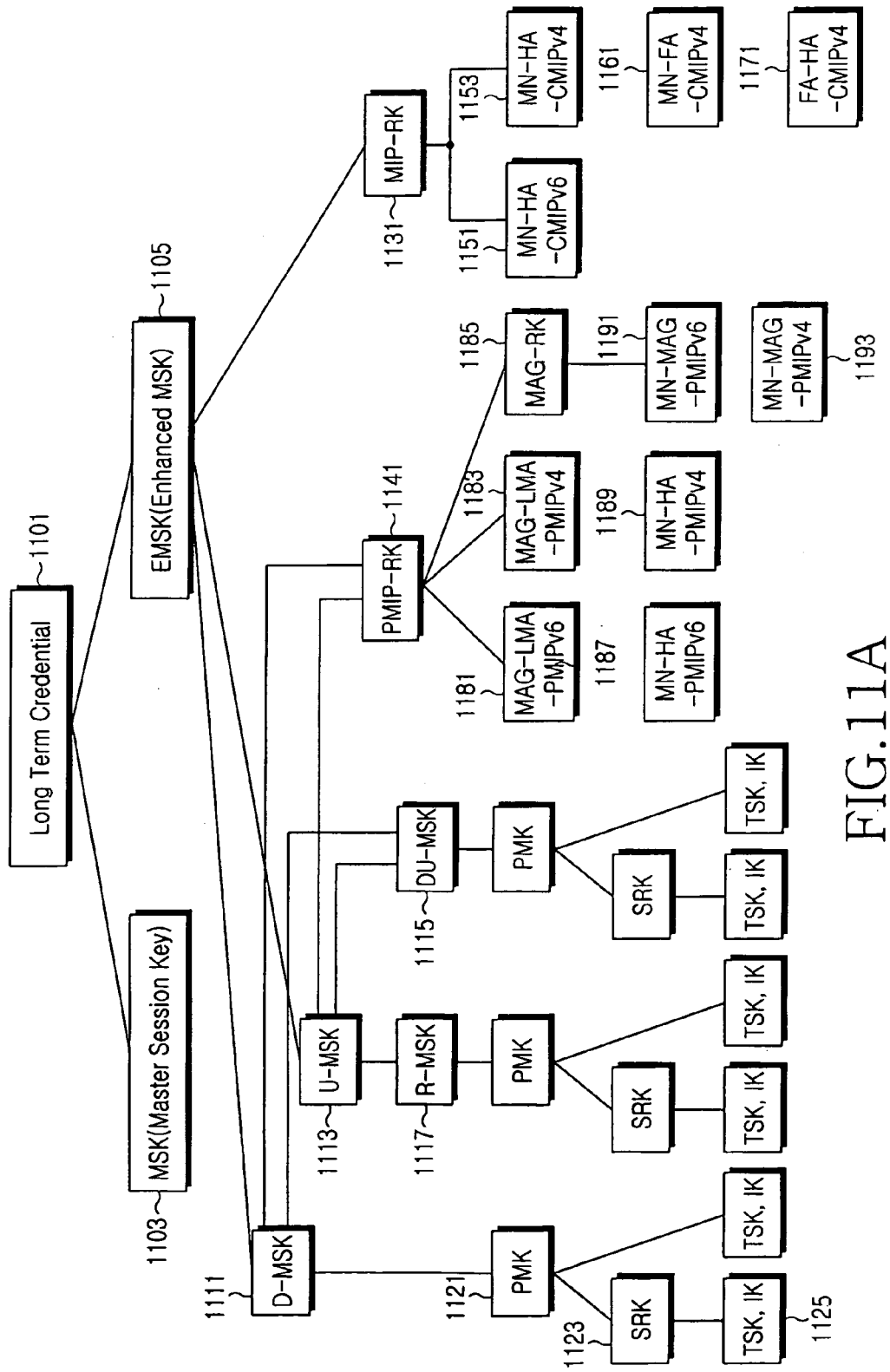
FIG. 11A illustrates a security key generation system based on EMSK, MIP-RK, PMIP-RK and MAG-RK according to a ninth embodiment of the present invention.
Figure 11B:
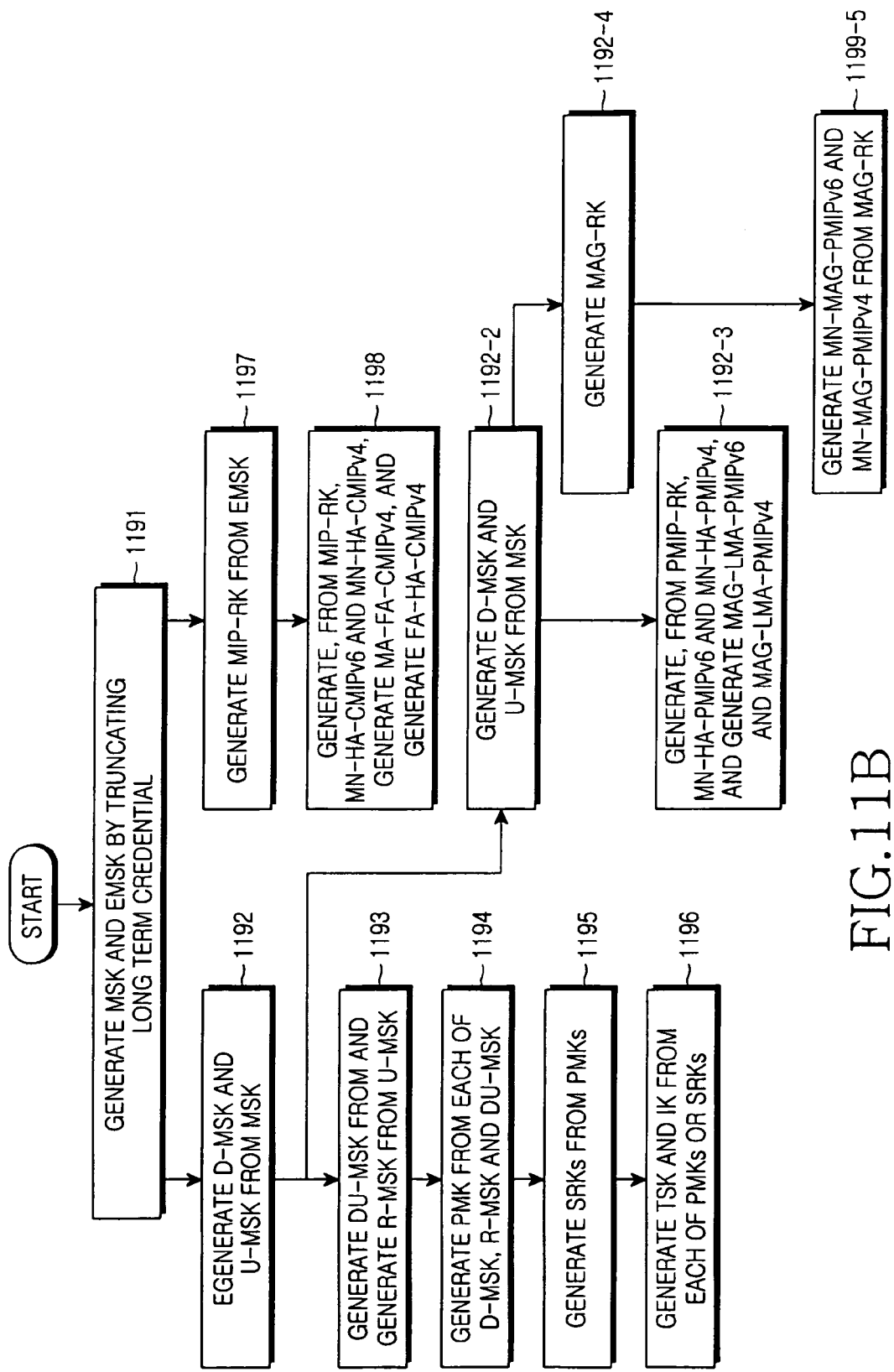
FIG. 11B illustrates a security key generation method based on EMSK, MIP-RK, PMIP-RK and MAG-RK according to the ninth embodiment of the present invention.

FIGS. 11A and 11B illustrate a security key generation system based on the EMSK, MIP-RK, PMIP-RK and MAG-RK, and a flowchart illustrating a security key generation method according to a ninth embodiment of the present invention, respectively. Since the ninth embodiment is basically to the same as the eighth embodiment, a description thereof will be given below only to the extent of its difference from the eighth embodiment.

FIG. 11A is different from FIG. 10A in that the MSKs to be used later, i.e., the D-MSK 1111, U-MSK 1113 and MIP-RK 1131 are generated from the EMSK 1105, and the PMIP-RK 1141 is generated from the D-MSK 1111 or U-MSK 1113. Therefore, in FIG. 11B, step 1192 is followed by step 1192-2 or a process of generating the PMIP-RK from the D-MSK or U-MSK, and then followed by the process of steps 1192-3, 1192-4 and 1192-5.

In step 1141, the PMIP-RK can be generated using the following Equation (40).

PMIP-RK=KDF(D-MSK or U-MSK, key label,
  option data, length)  (40)

A detailed example of Equation (40) can be given as Equation (41) or Equation (42), as follows:

PMIP-RK=HMAC-SHA1(D-MSK, "PMIP-RK")  (41)

In Equation (41), HMAC-SHA1 denotes an HMAC-SHA1 function.

PMIP-RK=HMAC-SHA1(U-MSK, "PMIP-RK")  (42)

In Equation (42), HMAC-SHA1 denotes an HMAC-SHA1 function.

Figure 12A:
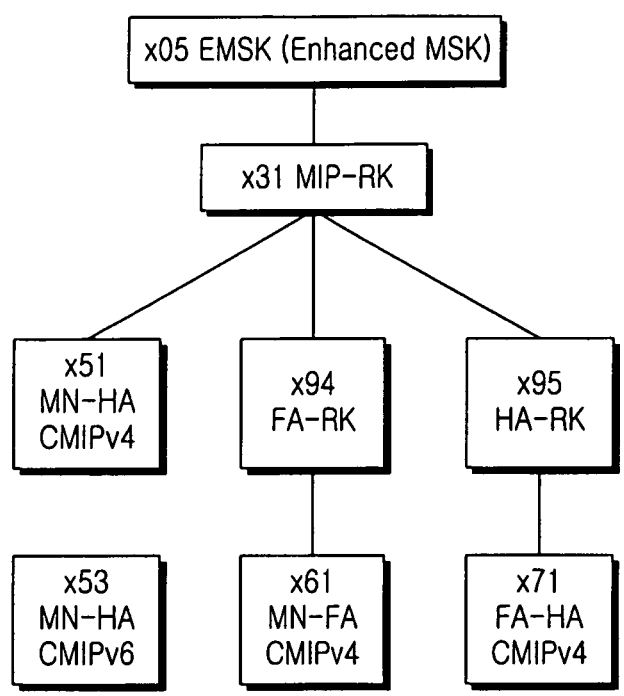
FIGS. 12A and 12B illustrate security key generation systems based on EMSK, MIP-RK, FA-RK and HA-RK according to tenth, eleventh and twelfth embodiments of the present invention.
Figure 12B:
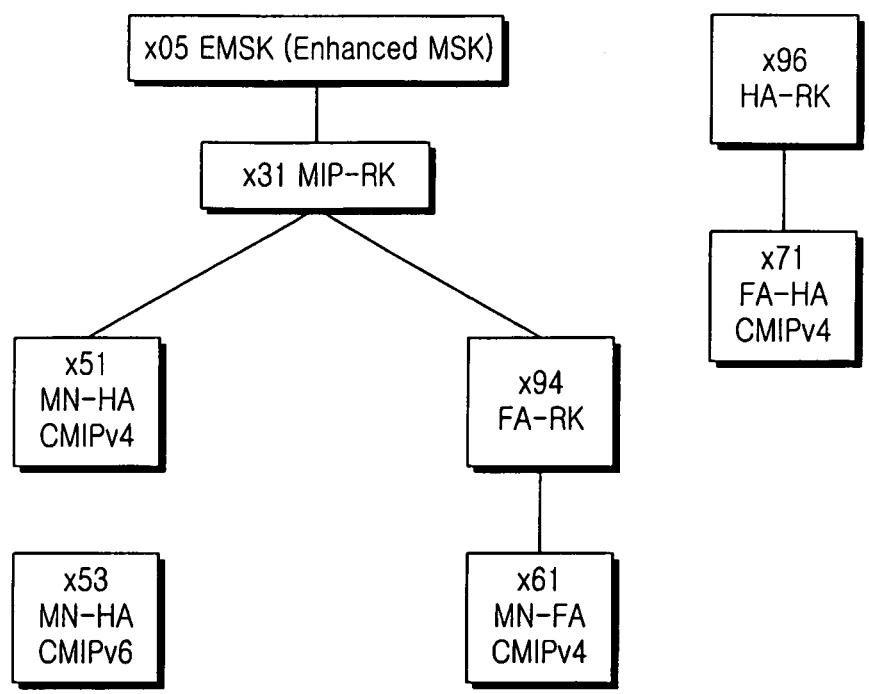

FIGS. 12A and 12B illustrate security key generation systems based on the EMSK, MIP-RK, FA-RK and HA-RK according to tenth, eleventh and twelfth embodiments of the present invention. Since the tenth, eleventh and twelfth embodiments are basically to the same as the foregoing seventh, eighth and ninth embodiments, a description thereof will be given below only to the extent of their differences from the seventh, eighth, and ninth embodiments. The security keys derived from the MIP-RK in the seventh, eighth, and ninth embodiments shown in FIGS. 9, 10 and 11 can be generated by the method described in FIG. 12A or 12B, and the same reference numerals will be used for each of the following cases, to give a clearer understanding. For example, in FIGS. 12A and 12B, x05 is the same process as the processes 905, 1005 and 1105, and this can be simply understood by substituting the MIP-RK part in FIGS. 9, 10 and 11.

FIGS. 12A and 12B are different from FIGS. 9A, 10A and 11A in that a MN-FA$_{\text{-}CMIPv4}$ key of step x61, i.e., 961, 1061 and 1161, is generated from the FA-RK of step x94. That is, while the MN-FA$_{\text{-}CMIPv4}$ key is generated from the MIP-RK in FIGS. 9A, 10A and 11A, the MN-FA$_{\text{-}CMIPv4}$ key is generated from the FA-RK in FIGS. 12A and 12B, and generation methods for the FA-RK and MN-FA$_{\text{-}CMIPv4}$ keys are as follows. That is, FA-RK is generated from MIP-RK in step x94, and MN-FA$_{\text{-}CMIPv4}$ key (x61) is generated from FA-RK (x94) in step x61. These keys are derived using Equations (43) and (44), respectively, as follows:

FA-RK=KDF(MIP-RK, "CMIPv4 FA RK")  (43)

MN-FA$_{\text{-}CMIPv4}$=KDF(FA-RK, "CMIPv4 MN FA"|FA-
  IPv4|MN-NAI)  (44)

In Equation (43), at least one of functions such as PRF and HMAC-SHA1 can be used as an example of KDF. In Equation (44), a function such as HMAC-SHA1 can be used as an example of KDF, and MN-NAI may not be used as input data of the function.

FIGS. 12A and 12B are different in terms of generation of FA-HA$_{\text{-}CMIPv4}$ key (X71). FIG. 12A is different from FIGS. 9A, 10A and 11A in that an FA-HA$_{\text{-}CMIPv4}$ key of step X71, i.e., 971, 1071 and 1171, is generated from the HA-RK of step x95. That is, while the FA-HA$_{CMIPv4}$ key is generated from the MIP-RK in FIGS. 9A, 10A and 11A, the FA-HA$_{CMIPv4}$ key is generated from the HA-RK in FIG. 12A, and generation methods for the HA-RK and FA-HA$_{CMIPv4}$ keys are as follows. That is, HA-RK is generated from the MIP-RK in step x95, and the FA-HA-$_{CMIPv4}$ key (x71) is generated from the HA-RK (x95) in step x71. These keys are derived using Equations (45) and (46), respectively, as follows:

HA-RK=KDF(MIP-RK, "CMIPv4 HA RK") (45)

In Equation (45), at least one of functions such as PRF and HMAC-SHA1 can be used as an example of KDF.

FA-HA$_{CMIPv4}$=KDF(HA-RK, "CMIPv4 FA HA"|HA-IPv4|FA-CoAv4|Nonce) (46)

In Equation (46), a function such as HMAC-SHA1 can be used as an example of KDF. In Equation (46), any one of FA-CoAv4 and Nonce may not be used as an input value.

Meanwhile, FIG. 12B is different from FIGS. 9A, 10A and 11A in that a FA-HA$_{CMIPv4}$ key of step x71, i.e., 971, 1071 and 1171, is generated from the HA-RK of step x95. However, while FIG. 12A is different in that the HA-RK is not generated from the MIP-RK like in step x95 and the HA-RK is not generated depending on the MIP-RK (x31) such as in step x96, FIG. 12A is equal in that the HA-RK (x96) is generated by the AAA and an FA-HA-$_{CMIPv4}$ key (x71) is generated from the HA-RK (x96) in step x71.

The method for randomly generating the HA-RK (x41) by means of the AAA without generating the HA-RK (x96) depending on the MIP-RK (x31) can be used when the AAA intends to assign an HA, and its length will not be specified herein. Therefore, this method can be used for an intention to assign an HA which does not exist depending on a particular MIP session, and a key according thereto. In generating a FA-HA-$_{CMIPv4}$ key (x71) from the HA-RK (x96) in step x71 of FIG. 12B, Equation (46) is used, but an SPI value of the HA-RK 607 can be used instead of Nonce unlike in FIG. 12A.

Figure 13A:
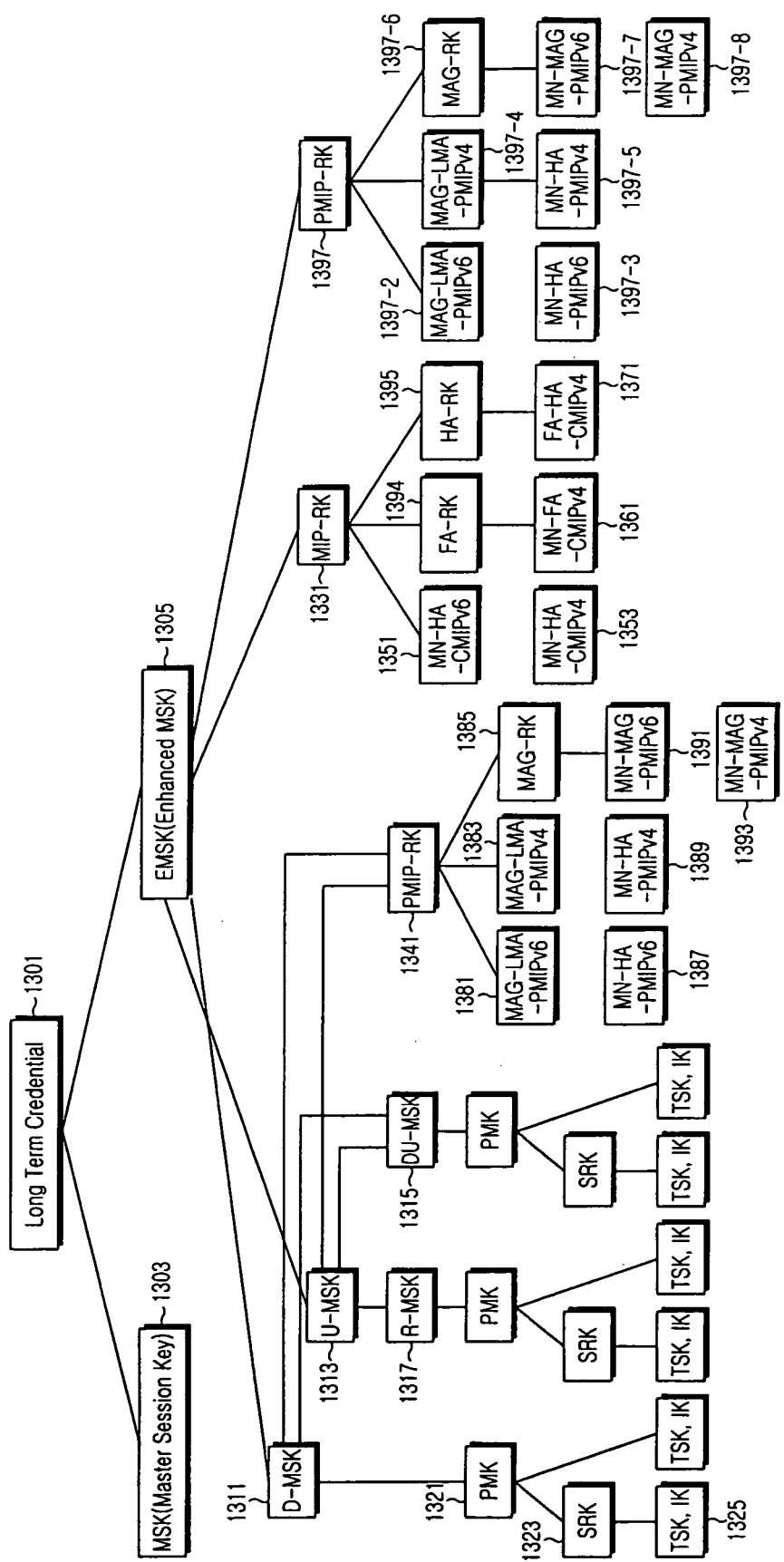
FIG. 13A illustrates a security key generation system based on EMSK, MIP-RK and PMIP-RK according to a thirteenth preferred embodiment of the present invention.
Figure 13B:
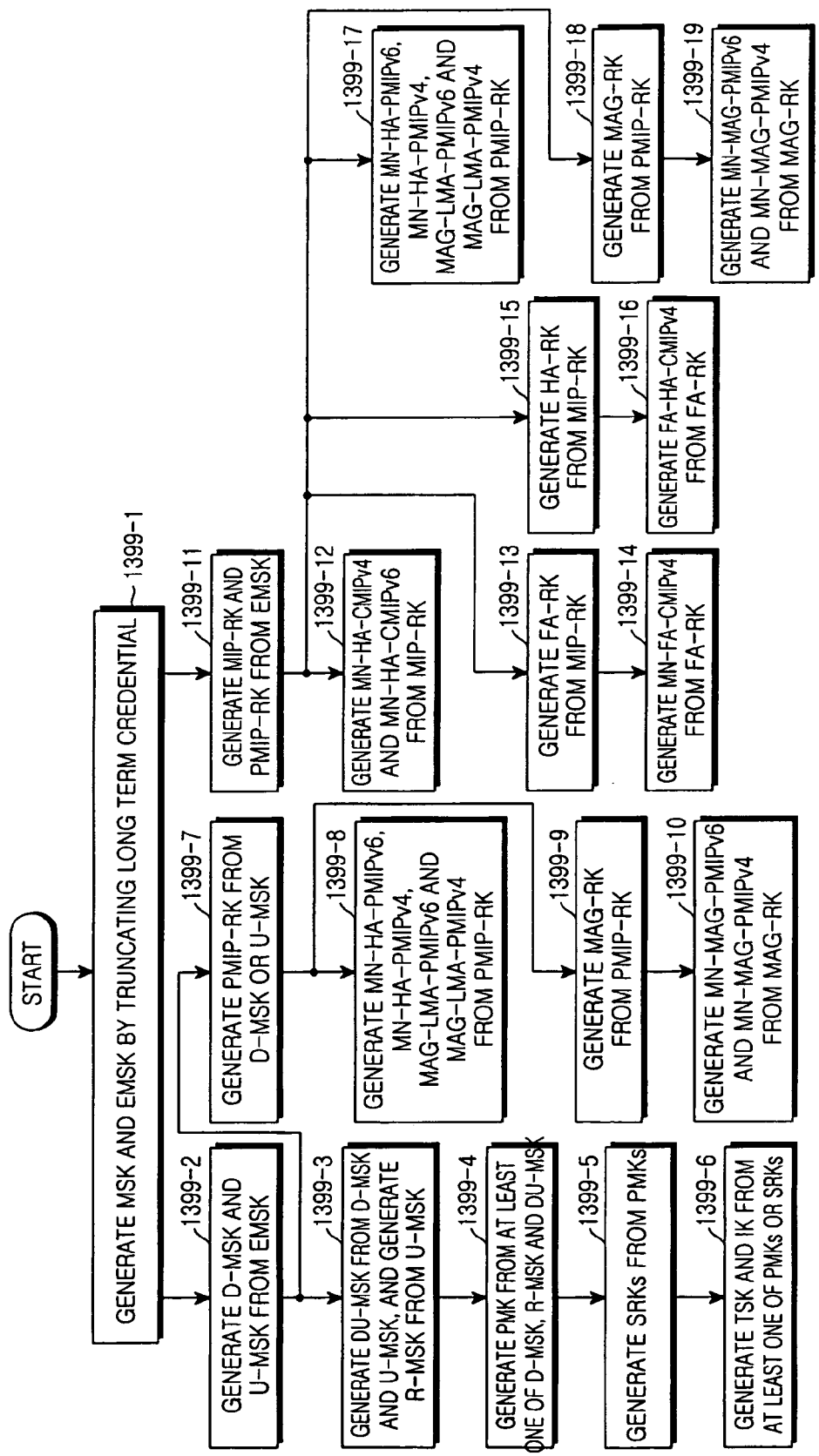
FIG. 13B illustrates a security key generation method based on EMSK, MIP-RK and PMIP-RK according to the thirteenth embodiment of the present invention.

FIGS. 13A and 13B illustrate a security key generation system based on the EMSK, MIP-RK and PMIP-RK, and a flowchart illustrating a security key generation method according to a thirteenth embodiment of the present invention, respectively. Since the thirteenth embodiment is equal to the ninth embodiment in the basic process, a description thereof will be given below only to the extent of its difference from the ninth embodiment. A method of generating a PMIP-RK 1341 and its sub keys is to the same as that of the ninth embodiment. A method of generating an MIP-RK 1331 and its sub keys of MN-HA 1351, FA-RK 1394, HA-RK 1395, MN-HA 1353, MN-FA 1361 and FA-HA 1371 follows the tenth, eleventh and twelfth embodiments of FIG. 12A. A method of generating a PMIP-RK 1397 and its sub keys 1397-2 to 1397-8 follows the method of generating PMIP-RK according to the eighth embodiment of FIG. 10.

Figure 14A:
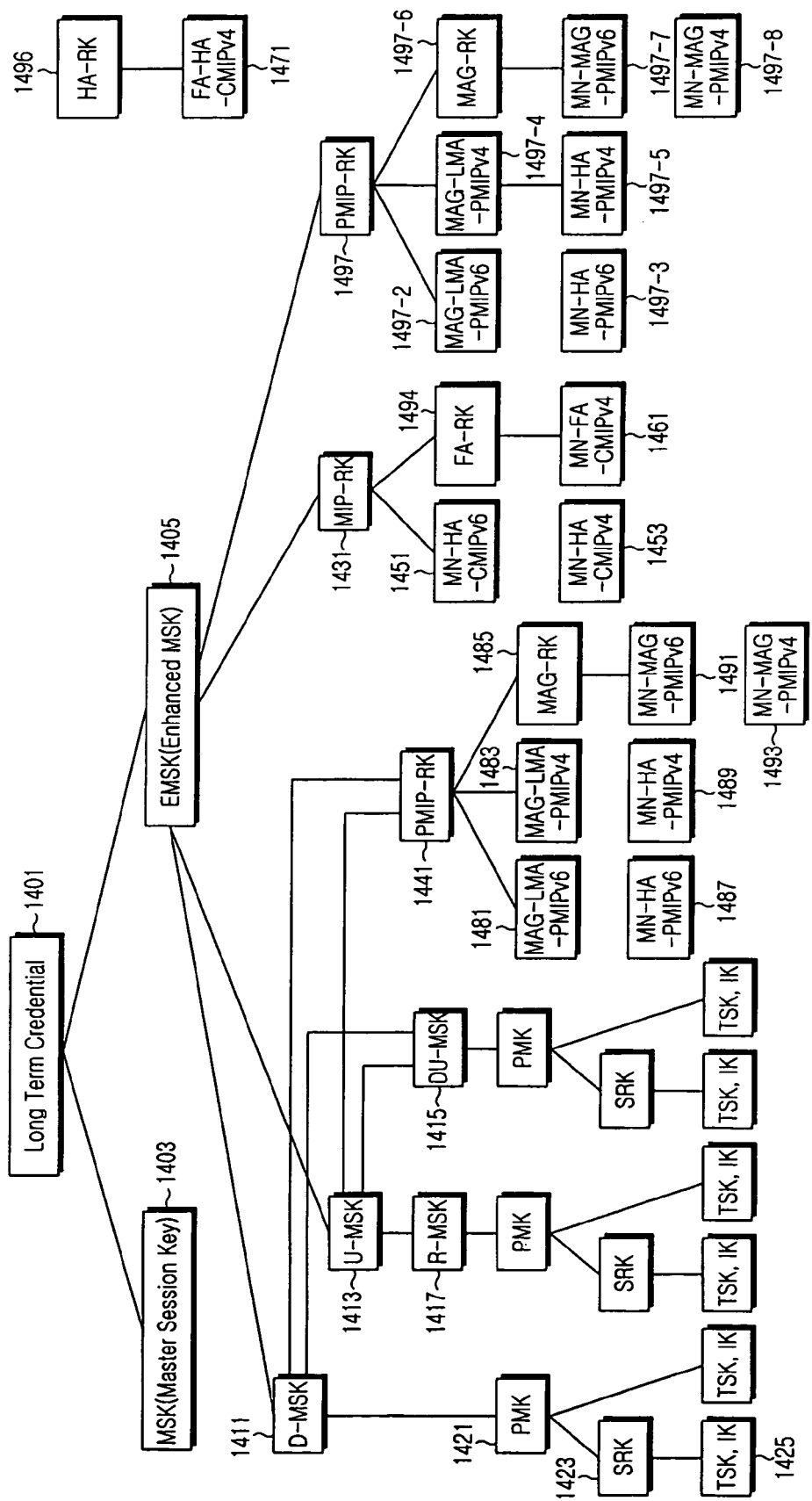
FIG. 14A illustrates a security key generation system based on EMSK, MIP-RK and PMIP-RK according to a fourteenth embodiment of the present invention.
Figure 14B:
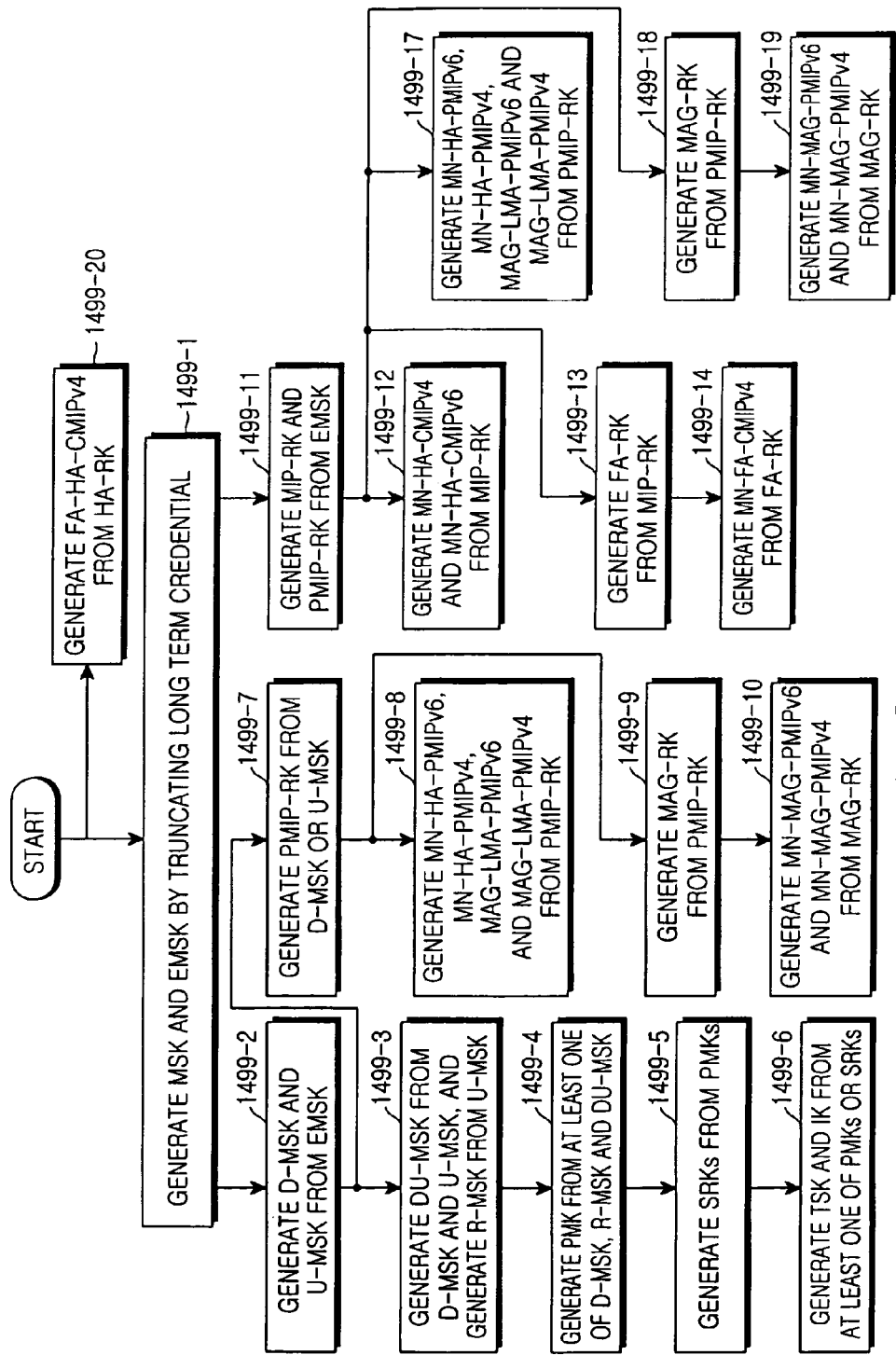
FIG. 14B illustrates a security key generation method based on EMSK, MIP-RK and PMIP-RK according to the fourteenth embodiment of the present invention.

FIGS. 14A and 14B illustrate a security key generation system based on the EMSK, MIP-RK and PMIP-RK, and a flowchart illustrating a security key generation method according to a fourteenth embodiment of the present invention, respectively. Since the fourteenth embodiment is to the same as the thirteenth embodiment in the basic process, a description thereof will be given below only to the extent of its difference from the thirteenth embodiment. The fourteenth embodiment is different from the thirteenth embodiment in that an HA-RK key 1496 used for generating an FA-HA$_{CMIPv4}$ 1471 is randomly generated by the AAA as done in the tenth, eleventh and twelfth embodiments of FIG. 12B.

As is apparent from the foregoing description, the present invention provides authentication and security in the UMB network, which is the next generation evolved technology of 3GPP2. That is, the present invention not only addresses the authentication and security problems occurring in 3GPP2 CDMA 1×EV-DO, i.e., the low-speed security setting problem, the key management complexity problem, and the security problem that use of services is possible without the due payment, but also securely guarantees a service denial against the message attack in both the RF and the protocol levels.

Further, the present invention securely performs the device/user authentication and MIP service authentication by solving the foregoing problems, making it possible to efficiently perform both communication and authentication even in the PPP-free environment where PPP is not used.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating a security key in a mobile communication system including an Authentication, Authorization and Accounting (AAA) server, the method comprising:
   generating, by the AAA server, a Master Session Key (MSK) and an Extended MSK (EMSK) using a Long Term Credential key; and
   transmitting the MSK and the EMSK to each of a plurality of nodes included in the mobile communication system,
   wherein one of the MSK and the EMSK are used for generating a Device-MSK (D-MSK) for device authentication and a User-MSK (U-MSK) for user authentication in a first node of the plurality of nodes,
   wherein the EMSK is used for generating a key that is used in a Mobile IP in a second node of the plurality of nodes, and the key that is used in the Mobile IP is used for generating a key that is used in a Client Mobile IP (CMIP) and a Proxy Mobile IP (PMIP), and
   wherein the U-MSK is truncated by a predetermined length to generate a Root-MSK that is used for authenticating the U-MSK.

2. The method of claim 1, wherein the D-MSK and the U-MSK are used for generating a key for managing a session in the first node.

3. The method of claim 2, wherein the key for managing the session is used for generating one of a key for data encryption and a key to verify data integrity in a third node of the plurality of nodes.

4. The method of claim 1, wherein the MSK and the EMSK are generated by truncating the Long Term Credential key.

5. An Authentication, Authorization and Accounting (AAA) server in a mobile communication system, comprising:
   a controller that generates a Master Session Key (MSK) and an Extended MSK (EMSK) using a Long Term Credential key; and
   a transmitter that transmits the MSK and the EMSK to each of a plurality of nodes included in the mobile communication system,
   wherein one of the MSK and the EMSK are used for generating a Device-MSK (D-MSK) for device authentication and a User-MSK (U-MSK) for user authentication in a first node of the plurality of nodes,
   wherein the EMSK is used for generating a key that is used in a Mobile IP in a second node of the plurality of nodes, and the key that is used in the Mobile IP is used for generating a key that is used in a Client Mobile IP (CMIP) and a Proxy Mobile IP (PMIP), and wherein the U-MSK is truncated by a predetermined length to generate a Root-MSK that is used for authenticating the U-MSK.

6. The AAA server of claim 5, wherein the D-MSK and the U-MSK are used for generating a key for managing a session in the first node.

7. The AAA server of claim 6, wherein the key for managing the session is used for generating one of a key for data encryption and a key to verify data integrity in a third node of the plurality of nodes.

8. The AAA server of claim 5, wherein the MSK and the EMSK are generated by truncating the Long Term Credential key.

* * * * *